(12) United States Patent
Selvanesan et al.

(10) Patent No.: US 12,058,704 B2
(45) Date of Patent: Aug. 6, 2024

(54) NR V2X RELIABILITY ENHANCEMENTS

(71) Applicant: Fraunhofer-Gesellschaft zur Förderung der angewandten Forschung e.V., Munich (DE)

(72) Inventors: Sarun Selvanesan, Berlin (DE); Thomas Fehrenbach, Berlin (DE); Roya Ebrahim Rezagah, Berlin (DE); Cornelius Hellge, Berlin (DE); Thomas Wirth, Berlin (DE); Thomas Schierl, Berlin (DE); Robin Thomas, Berlin (DE); Baris Göktepe, Berlin (DE); Eiko Seidel, Sauerlach (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 337 days.

(21) Appl. No.: 17/369,391

(22) Filed: Jul. 7, 2021

(65) Prior Publication Data

US 2021/0337509 A1    Oct. 28, 2021

Related U.S. Application Data

(63) Continuation of application No. PCT/EP2020/050259, filed on Jan. 8, 2020.

(30) Foreign Application Priority Data

Jan. 10, 2019  (EP) .................................... 19151289

(51) Int. Cl.
*H04W 72/02*    (2009.01)
*H04W 72/00*    (2023.01)
(Continued)

(52) U.S. Cl.
CPC ........... *H04W 72/30* (2023.01); *H04W 72/02* (2013.01); *H04W 72/0446* (2013.01); *H04W 72/0453* (2013.01); *H04W 92/18* (2013.01)

(58) Field of Classification Search
None
See application file for complete search history.

(56) References Cited

U.S. PATENT DOCUMENTS

2014/0328329 A1* 11/2014 Novlan ............. H04W 56/0015
                                                           370/336
2018/0302886 A1    10/2018 Pan et al.
(Continued)

FOREIGN PATENT DOCUMENTS

CN    108738157        11/2018
CN    108811175 A      11/2018
(Continued)

OTHER PUBLICATIONS

3GPP TR 21.914 V14.0.0, "Technical Specification Group Services and System Aspects; Release 14 Description; Summary of Rel-14 Work Items", 3GPP, May 2018.
(Continued)

*Primary Examiner* — Hong Shao
(74) *Attorney, Agent, or Firm* — NKL LAW; Jae Youn Kim

(57) ABSTRACT

A wireless communication system includes a plurality of user devices, UEs, configured for a sidelink communication using resources from a set of sidelink resources of the wireless communication system. The plurality of UEs includes at least one transmitting UE and at least one receiving UE, the transmitting UE and the receiving UE configured to use at least a subset of the sidelink resources of the wireless communication system for the sidelink communication. The wireless communication system is configured to allow a data duplication on the sidelink, wherein
(Continued)

the data duplication on the sidelink is activated or triggered dependent on one or more of a sidelink quality of the sidelink between the transmitting UE and the receiving UE, and/or an occupancy of the sidelink resources, and/or data received by a network element/network function, and/or the application service running on one of the UEs.

19 Claims, 7 Drawing Sheets

(51) Int. Cl.

| | |
|---|---|
| *H04W 72/0446* | (2023.01) |
| *H04W 72/0453* | (2023.01) |
| *H04W 72/30* | (2023.01) |
| *H04W 74/04* | (2009.01) |
| *H04W 92/18* | (2009.01) |

(56) References Cited

U.S. PATENT DOCUMENTS

| | | | |
|---|---|---|---|
| 2018/0324641 A1 | 11/2018 | Tsai et al. | |
| 2019/0215685 A1* | 7/2019 | Wang .................. | H04W 4/40 |

FOREIGN PATENT DOCUMENTS

| | | |
|---|---|---|
| KR | 10-2018-0103717 A | 9/2018 |
| WO | 2018202797 A1 | 11/2018 |

OTHER PUBLICATIONS

IEEE, "IEEE Standard for Information Technology—Telecommunications and information exchange between systems—Local and metropolitan area networks—Specific requirements, Part 11: Wireless LAN Medium Access Control (MAC) and Physical Layer (PHY) Specifications; Amendment 6: Wireless Access in Vehicular Environments", IEEE Std 802.11p-2010, IEEE Computer Society, Sponsored by the LAN/MAN Standards Committee, Jul. 15, 2010, New York, USA.

Oppo, "Discussion on Sidelink Unicast and Groupcast for NR-V2X", 3GPP TSg-RAN WG2 Meeting #104, R2-1816339, November 12-16, 201, Spokane, US.

LG Electronics Inc. (Rapporteur), "Report of [103bis#36] SL broadcast, UP aspects (LG)", 3GPP Draft; R2-1818420 Report of 103B#36 NR SL Broadcast UP Aspects, 3GPP, Mobile Competence Centre; 650, Route des Lucioles; F-06921 Sophia-Antipolis Cedex; Fra; vol. RAN WG2, No. XP051482282, Nov. 7, 2018, Spokane, USA.

ZTE, "Consideration on Resource-Efficient PDCP Duplication", 3GPP Draft; R3-186540; 3GPP, Mobile Competence Centre, 650, Route des Lucioles, F-06921 Sophia-Antipolis Cedex, vol. RAN WG3, Spokane, XP051558322, Nov. 11, 2018, WA, USA.

3GPP TR 36.785, V.14.0.0, Technical Specification Group Radio Access Network; "Vehicle to Vehicle (V2V) services based on LTE sidelink; User Equipment (UE) radio transmission and reception", Release 14, 3GPP, Oct. 2016.

ETSI TS 138 300 3GPP TS 38.300, V. 16.5.0, "5G; NR; NR and NG-RAN Overall description", Stage-2, Release 16, Apr. 2021, pp. 117-118.

3GPP ETSI TS 136 300 V15.3.0, Release 15, Technical Specification; "LTE; E-UTRA and E-UTRAN; Overall description; Stage 2", 3GPP, Oct. 2018.

3GPP TS 38.300 V15.3.0, "Technical Specification Group Radio Access Network; NR; NR and NG-RAN Overall Description; Stage 2", Release 15, 3GPP, Sep. 2018.

3GPP TS38.331 V15.3.0, "Technical Specification Group Radio Access Network; NR; RRC protocol specification", Release 15, 3GPP, Sep. 2018.

3GPP ETSI TS 136.321 V14.2.1, "LTE; E-UTRA; MAC protocol specification", 3GGP, May 2017.

3GPP TSG RAN WG1 Meeting #96, "Final Report of 3GPP TSG RAN WG1 #AH_1901 v1.0.0", MCC Support, 3GPP, Feb. 25-Mar. 1, 2019, Taipei.

3GPP ETSI TS 136 201 V14.1.0, "LTE; E-UTRA; LTE physical layer; General description", p. 9, last para. of 4.2.1, 3GPP, Apr. 2017.

3GPP TSG RAN\WG2_RL2, TSGR2_101 Feb. 12, 2018 Potevio, R2-1801983, "Consideration on Packet Duplication over Sidelink", 1-19; Athens, Greece, Feb. 26-Mar. 2, 2018.

3GPP TSG RAN 2-RL2, TSGR2_103bis Sep. 28, 2018 LG Electronics Inc., R2-1815441 NR Sidelink design based on LTE Sidelink; Chengdu, China, Oct. 8-12, 2018.

\* cited by examiner

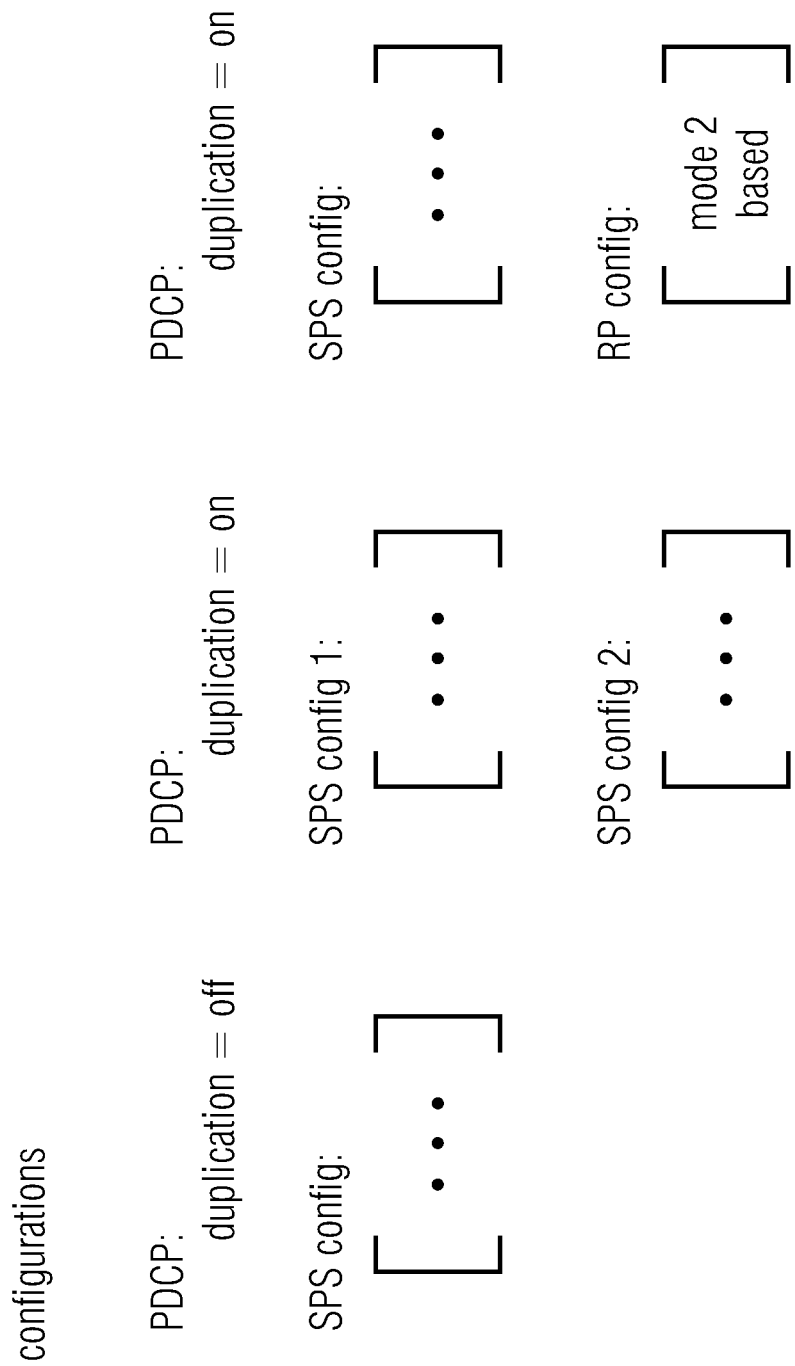

NR V2X RELIABILITY ENHANCEMENTS

CROSS-REFERENCE TO RELATED APPLICATIONS

This application is a continuation of copending International Application No. PCT/EP2020/050259, filed Jan. 8, 2020, which is incorporated herein by reference in its entirety, and additionally claims priority from European Application No. 19151289.6, filed Jan. 10, 2019, which is also incorporated herein by reference in its entirety.

BACKGROUND OF THE INVENTION

The present application relates to the field of wireless communication systems or networks, more specifically to approaches for a wireless communication among user devices of a wireless communication system using a sidelink communication, like a V2X communication. Embodiments concern improvements in the communication over the sidelink, e.g., NR V2X reliability enhancements.

FIG. 1 is a schematic representation of an example of a terrestrial wireless network 100 including, as is shown in FIG. 1(a), a core network 102 and one or more radio access networks $RAN_1$, $RAN_2$, ... $RAN_N$. FIG. 1(b) is a schematic representation of an example of a radio access network $RAN_n$ that may include one or more base stations $gNB_1$ to $gNB_5$, each serving a specific area surrounding the base station schematically represented by respective cells $106_1$ to $106_5$. The base stations are provided to serve users within a cell. The term base station, BS, refers to a gNB in 5G networks, an eNB in UMTS/LTE/LTE-A/LTE-A Pro, a road side unit (RSU) in a cellular network supporting vehicular-to-infrastructure communication (V2X), or just a BS in other mobile communication standards. A user may be a stationary device or a mobile device. The wireless communication system may also be accessed by mobile or stationary IoT devices which connect to a base station or to a user. The mobile devices or the IoT devices may include physical devices, ground based vehicles, such as robots or cars, aerial vehicles, such as manned or unmanned aerial vehicles (UAVs), the latter also referred to as drones, buildings and other items or devices having embedded therein electronics, software, sensors, actuators, or the like as well as network connectivity that enables these devices to collect and exchange data across an existing network infrastructure. FIG. 1(b) shows an exemplary view of five cells, however, the $RAN_n$ may include more or less such cells, and $RAN_n$ may also include only one base station. FIG. 1(b) shows two users $UE_1$ and $UE_2$, also referred to as user equipment, UE, that are in cell $106_2$ and that are served by base station $gNB_2$. Another user $UE_3$ is shown in cell $106_4$ which is served by base station $gNB_4$. The arrows $108_1$, $108_2$ and $108_3$ schematically represent uplink/downlink connections for transmitting data from a user $UE_1$, $UE_2$ and $UE_3$ to the base stations $gNB_2$, $gNB_4$ or for transmitting data from the base stations $gNB_2$, $gNB_4$ to the users $UE_1$, $UE_2$, $UE_3$. Further, FIG. 1(b) shows two IoT devices $110_1$ and $110_2$ in cell $106_4$, which may be stationary or mobile devices. The IoT device $110_1$ accesses the wireless communication system via the base station $gNB_4$ to receive and transmit data as schematically represented by arrow $112_1$. The IoT device $110_2$ accesses the wireless communication system via the user $UE_3$ as is schematically represented by arrow $112_2$. The respective base station $gNB_1$ to $gNB_5$ may be connected to the core network 102, e.g. via the S1 interface, via respective backhaul links $114_1$ to $114_5$, which are schematically represented in FIG. 1(b) by the arrows pointing to "core". The core network 102 may be connected to one or more external networks, e.g. the Internet. Furthermore, the core network can be the evolved packet core (EPC) as used in LTE and/or the 5G core network (5GC). Further, some or all of the respective base station $gNB_1$ to $gNB_5$ may connected, e.g. via the S1 or X2 interface or the XN interface in NR, with each other via respective backhaul links $116_1$ to $116_5$, which are schematically represented in FIG. 1(b) by the arrows pointing to "gNBs".

For data transmission a physical resource grid may be used. The physical resource grid may comprise a set of resource elements to which various physical channels and physical signals are mapped. For example, the physical channels may include the physical downlink, uplink and sidelink shared channels (PDSCH, PUSCH, PSSCH) carrying user specific data, also referred to as downlink, uplink or sidelink payload data, the physical broadcast channel (PBCH) carrying for example a master information block (MIB) and a system information block (SIB), the physical downlink, uplink and sidelink control channels (PDCCH, PUCCH, PSCCH) carrying for example the downlink control information (DCI), the uplink control information (UCI) and the sidelink control information (SCI). For the uplink, the physical channels may further include the physical random access channel (PRACH or RACH) used by UEs for accessing the network once a UE synchronized and obtained the MIB and SIB. The physical signals may comprise reference signals or symbols (RS), e.g. such as the RS to measure the channel state information (CSI-RS), synchronization signals (SS) and the like. The resource grid may comprise a frame or radio frame having a certain duration in the time domain and having a given bandwidth in the frequency domain. The frame may have a certain number of subframes of a predefined length, e.g. 1 ms. Each subframe may include two slots of 6 or 7 OFDM symbols depending on the cyclic prefix (CP) length. In NR a subframe may also contain one or more slots depending on the numerology. Each slot may contain 12 or 14 symbols depending on the CP length of the numerology used. A frame may also consist of a smaller number of OFDM symbols, e.g. when utilizing shortened transmission time intervals (sTTI) or a mini-slot/non-slot-based frame structure comprising just a few OFDM symbols. In frequency domain, the OFDM symbols can use a subcarrier spacing (SCS) of 15~kHz, also referred to as baseline numerology. Other supported SCS can be 30~kHz, 60~kHz, 120~kHz or 240~kHz or any other multiple or divider of 15~kHz SCS.

The wireless communication system may be any single-tone or multicarrier system using frequency-division multiplexing, like the orthogonal frequency-division multiplexing (OFDM) system, the orthogonal frequency-division multiple access (OFDMA) system, or any other IFFT-based signal with or without CP, e.g. DFT-s-OFDM. Other waveforms, like non-orthogonal waveforms for multiple access, e.g. filter-bank multicarrier (FBMC), generalized frequency division multiplexing (GFDM) or universal filtered multi carrier (UFMC), may be used. The wireless communication system may operate, e.g., in accordance with the LTE-Advanced pro standard or the 5G or NR, New Radio, standard.

The wireless network or communication system depicted in FIG. 1 may by a heterogeneous network having distinct overlaid networks, e.g., a network of macro cells with each macro cell including a macro base station, like base station $gNB_1$ to $gNB_5$, and a network of small cell base stations (not shown in FIG. 1), like femto or pico base stations.

In addition to the above described terrestrial wireless network also non-terrestrial wireless communication networks exist including spaceborne transceivers, like satellites, and/or airborne transceivers, like unmanned aircraft systems. The non-terrestrial wireless communication network or system may operate in a similar way as the terrestrial system described above with reference to FIG. 1, for example in accordance with the LTE-Advanced Pro standard or the 5G or NR, new radio, standard.

In mobile communication networks, for example in a network like that described above with reference to FIG. 1, like an LTE or 5G/NR network, there may be UEs that communicate directly with each other over one or more sidelink (SL) channels, e.g., using the PC5 interface. UEs that communicate directly with each other over the sidelink may include vehicles communicating directly with other vehicles (V2V communication), vehicles communicating with other entities of the wireless communication network (V2X communication), for example roadside entities or roadside units (RSU), like traffic lights, traffic signs, or pedestrians. Other UEs may not be vehicular related UEs and may comprise any of the above-mentioned devices. Such devices may also communicate directly with each other (D2D communication) using the SL channels.

When considering two UEs directly communicating with each other over the sidelink, both UEs may be served by the same base station so that the base station may provide sidelink resource allocation configuration or assistance for the UEs. For example, both UEs may be within the coverage area of a base station, like one of the base stations depicted in FIG. 1. This is referred to as an "in-coverage" scenario. Another scenario is referred to as an "out-of-coverage" scenario. It is noted that "out-of-coverage" does not mean that the two UEs are not within one of the cells depicted in FIG. 1, rather, it means that these UEs
- may not be connected to a base station, for example, they are not in an RRC connected state, so that the UEs do not receive from the base station any sidelink resource allocation configuration or assistance, and/or
- may be connected to the base station, but, for one or more reasons, the base station may not provide sidelink resource allocation configuration or assistance for the UEs, and/or
- may be connected to the base station that may not support NR V2X services, e.g. GSM, UMTS, LTE base stations.

When considering two UEs directly communicating with each other over the sidelink, e.g. using the PC5 interface, one of the UEs may also be connected with a BS, and may relay information from the BS to the other UE via the sidelink interface. The relaying may be performed in the same frequency band (in-band-relay) or another frequency band (out-of-band relay) may be used. In the first case, communication on the Uu and on the sidelink may be decoupled using different time slots as in time division duplex, TDD, systems.

FIG. 2 is a schematic representation of an in-coverage scenario in which two UEs directly communicating with each other are both connected to a base station. The base station gNB has a coverage area that is schematically represented by the circle 200 which, basically, corresponds to the cell schematically represented in FIG. 1. The UEs directly communicating with each other include a first vehicle 202 and a second vehicle 204 both in the coverage area 200 of the base station gNB. Both vehicles 202, 204 are connected to the base station gNB and, in addition, they are connected directly with each other over the PC5 interface.

The scheduling and/or interference management of the V2V traffic is assisted by the gNB via control signaling over the Uu interface, which is the radio interface between the base station and the UEs. In other words, the gNB provides SL resource allocation configuration or assistance for the UEs, and the gNB assigns the resources to be used for the V2V communication over the sidelink. This configuration is also referred to as a mode 1 configuration in NR V2X or as a mode 3 configuration in LTE V2X.

FIG. 3 is a schematic representation of an out-of-coverage scenario in which the UEs directly communicating with each other are either not connected to a base station, although they may be physically within a cell of a wireless communication network, or some or all of the UEs directly communicating with each other are to a base station but the base station does not provide for the SL resource allocation configuration or assistance. Three vehicles 206, 208 and 210 are shown directly communicating with each other over a sidelink, e.g., using the PC5 interface. The scheduling and/or interference management of the V2V traffic is based on algorithms implemented between the vehicles. This configuration is also referred to as a mode 2 configuration in NR V2X or as a mode 4 configuration in LTE V2X. As mentioned above, the scenario in FIG. 3 which is the out-of-coverage scenario does not necessarily mean that the respective mode 4 in LTE (or mode 2 in NR) UEs are outside of the coverage 200 of a base station, rather, it means that the respective mode 4 in LTE (or mode 2 in NR) UEs are not served by a base station, are not connected to the base station of the coverage area, or are connected to the base station but receive no SL resource allocation configuration or assistance from the base station. Thus, there may be situations in which, within the coverage area 200 shown in FIG. 2, in addition to the mode 3 UEs 202, 204 also mode 4 in LTE (or mode 2 in NR) UEs 206, 208, 210 are present.

In the above-described scenarios of vehicular user devices, UEs, a plurality of such user devices may form a user device group, also referred to simply as group, and the communication within the group or among the group members may be performed via the sidelink interfaces between the user devices, like the PC5 interface. For example, the above-described scenarios using vehicular user devices may be employed in the field of the transport industry in which a plurality of vehicles being equipped with vehicular user devices may be grouped together, for example, by a remote driving application. Other use cases in which a plurality of user devices may be grouped together for a sidelink communication among each other include, for example, factory automation and electrical power distribution. In the case of factory automation, a plurality of mobile or stationary machines within a factory may be equipped with user devices and grouped together for a sidelink communication, for example for controlling the operation of the machine, like a motion control of a robot. In the case of electrical power distribution, entities within the power distribution grid may be equipped with respective user devices which, within a certain area of the system may be grouped together so as to communicate via a sidelink communication with each other so as to allow for monitoring the system and for dealing with power distribution grid failures and outages.

Naturally, in the above-mentioned use cases sidelink communication is not limited to a communication within a group. Rather, the sidelink communication may be among any of UEs, like any pair of UEs.

It is noted that the information in the above section is only for enhancing the understanding of the background of the invention and therefore it may contain information that does not form conventional technology that is already known to a person of ordinary skill in the art.

Starting from a conventional technology as described above, there may be a need for reliability enhancements in the communication over the sidelink, e.g., in NR V2X.

SUMMARY

According to an embodiment, a wireless communication system may have: a plurality of user devices, UEs, configured for a sidelink communication using resources from a set of sidelink resources of the wireless communication system, wherein the plurality of UEs comprises at least one transmitting UE and at least one receiving UE, the transmitting UE and the receiving UE configured to use at least a subset of the sidelink resources of the wireless communication system for the sidelink communication, and wherein the wireless communication system is configured to allow a data duplication on the sidelink, wherein the data duplication on the sidelink is activated or triggered dependent on one or more of
 a sidelink quality of the sidelink between the transmitting UE and the receiving UE, and/or
 an occupancy of the sidelink resources, and/or
 data received by a network element/network function, and/or
 the application service running on one of the UEs.

Another embodiment may have a base station for a wireless communication system, the wireless communication system including a plurality of user devices, UEs, configured for a sidelink communication using resources from a set of sidelink resources of the wireless communication system, wherein the plurality of UEs comprises at least one transmitting UE and at least one receiving UE, the transmitting UE and the receiving UE configured to use at least a subset of the sidelink resources of the wireless communication system for the sidelink communication, wherein the base station is configured to allow a data duplication on the sidelink, wherein the data duplication on the sidelink is activated or triggered dependent on one or more of
 a sidelink quality of the sidelink between the transmitting UE and the receiving UE, and/or
 an occupancy of the sidelink resources, and/or
 data received by a network element/network function, and/or
 the application service running on one of the UEs.

Still another embodiment may have a user device, UE, for a wireless communication system, the wireless communication system including a plurality of user devices, UEs, configured for a sidelink communication using resources from a set of sidelink resources of the wireless communication system, wherein the UE is a transmitting UE and is configured to use at least a subset of the sidelink resources of the wireless communication system for the sidelink communication with at least one receiving UE, wherein the UE is configured to allow a data duplication on the sidelink, wherein the data duplication on the sidelink is activated or triggered dependent on one or more of
 a sidelink quality of the sidelink between the transmitting UE and the receiving UE, and/or
 an occupancy of the sidelink resources, and/or
 data received by a network element/network function, and/or
 the application service running on one of the UEs.

According to another embodiment, a method for operating a wireless communication system, the wireless communication system including a plurality of user devices, UEs, configured for a sidelink communication using resources from a set of sidelink resources of the wireless communication system, wherein the plurality of UEs comprises at least one transmitting UE and at least one receiving UE, may have the steps of: performing a sidelink communication between the transmitting UE and the receiving UE using at least a subset of the sidelink resources of the wireless communication system, allowing a data duplication on the sidelink, wherein the data duplication on the sidelink is activated or triggered dependent on one or more of
 a sidelink quality of the sidelink between the transmitting UE and the receiving UE, and/or
 an occupancy of the sidelink resources, and/or
 data received by a network element/network function, and/or
 the application service running on one of the UEs.

Another embodiment may have a non-transitory digital storage medium having stored thereon a computer program for performing a method for operating a wireless communication system, the wireless communication system including a plurality of user devices, UEs, configured for a sidelink communication using resources from a set of sidelink resources of the wireless communication system, wherein the plurality of UEs comprises at least one transmitting UE and at least one receiving UE, the method having the steps of: performing a sidelink communication between the transmitting UE and the receiving UE using at least a subset of the sidelink resources of the wireless communication system, allowing a data duplication on the sidelink, wherein the data duplication on the sidelink is activated or triggered dependent on one or more of
 a sidelink quality of the sidelink between the transmitting UE and the receiving UE, and/or
 an occupancy of the sidelink resources, and/or
 data received by a network element/network function, and/or
 the application service running on one of the UEs,
when said computer program is run by a computer.

BRIEF DESCRIPTION OF THE DRAWINGS

Embodiments of the present invention are now described in further detail with reference to the accompanying drawings, in which:

FIGS. 8(a)-8(c) illustrate an embodiment of an explicit trigger of the data duplication using the PDCP information including the SL grant free configuration field.

DETAILED DESCRIPTION OF THE INVENTION

Embodiments of the present invention is now described in more detail with reference to the accompanying drawings in which the same or similar elements have the same reference signs assigned.

The initial vehicle-to-everything (V2X) specification was included in LTE Release 14 of the 3GPP standard. The scheduling and assignment of resources had been modified according to the V2X requirements, while the original device-to-device (D2D) communication standard has been used as a basis of the design. Cellular V2X has been agreed to operate in two configurations from a resource allocation perspective, namely in the above-described mode 3 and mode 4 configurations. As mentioned above, in the V2X mode 3 configuration the scheduling and interference management of resources is performed by the base station for UEs so as to enable sidelink, SL, communications, like vehicle-to-vehicle communications. The control signaling is provided to the UE over the Uu interface, for example using the downlink control indicator, DCI, and is dynamically assigned by the base station. In the V2X mode 4 configuration the scheduling and interference management for SL communications is autonomously performed using distributed or decentralized algorithms among the UEs based on a pre-configured resource configuration.

Figure 1A:
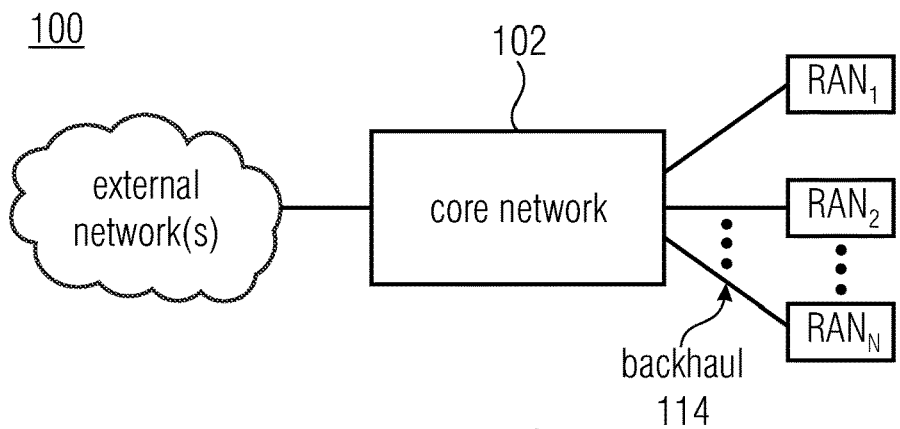
FIGS. 1(a)-1(b) show a schematic representation of an example of a wireless communication system.
Figure 1B:
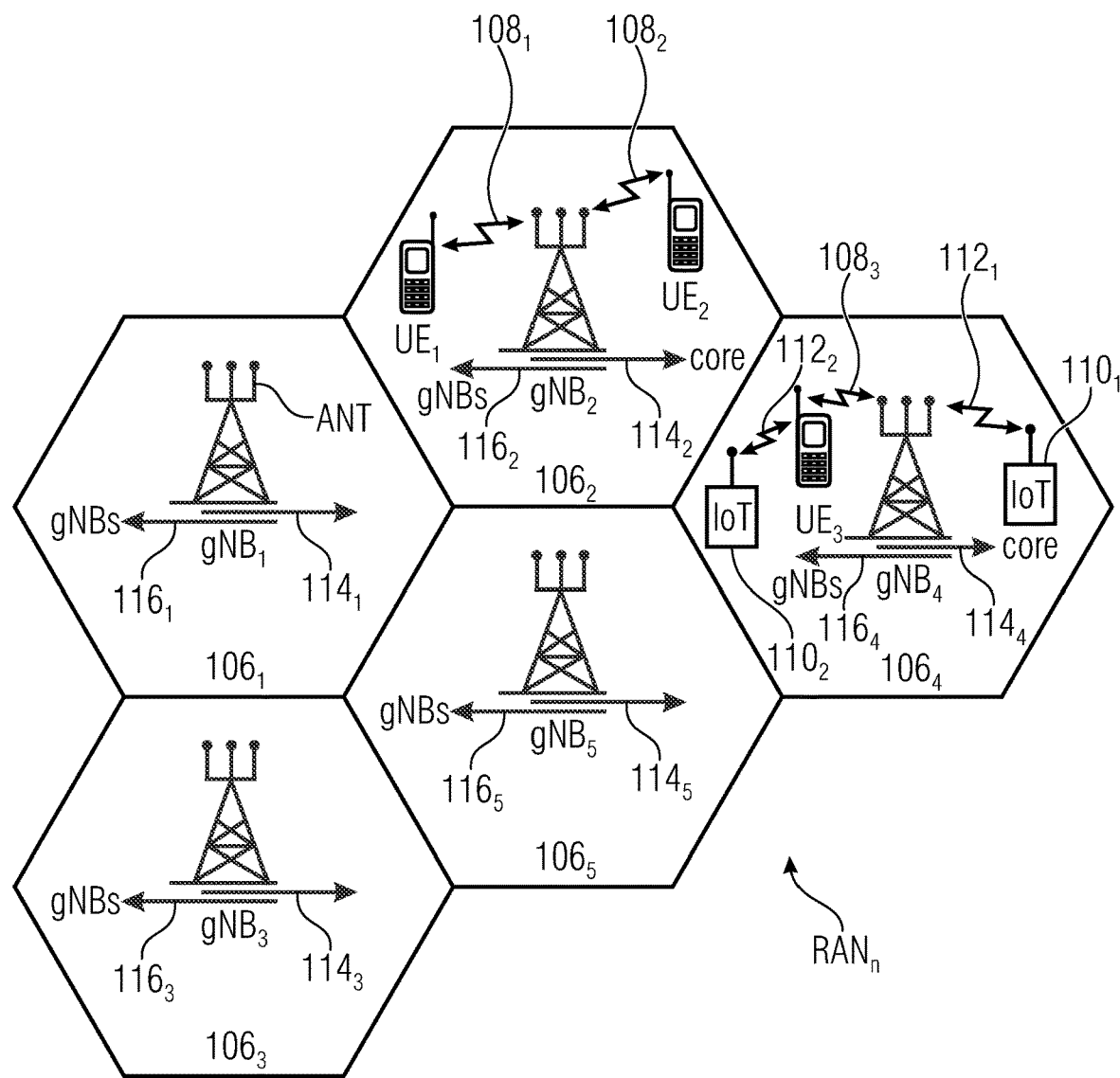
Figure 2:
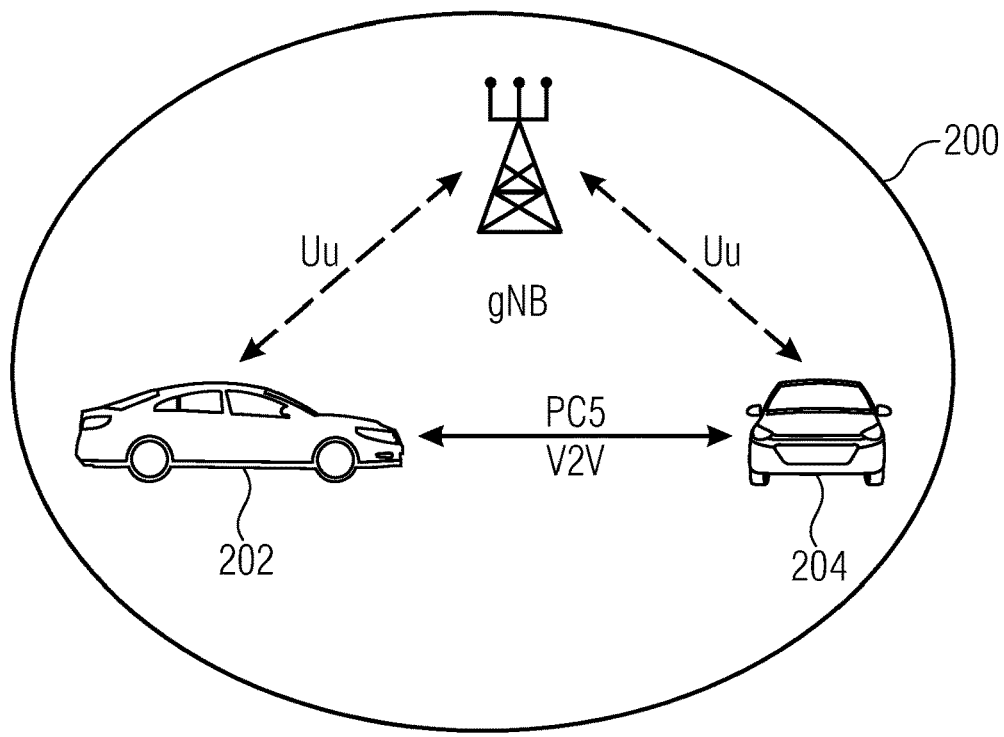
FIG. 2 is a schematic representation of an in-coverage scenario in which UEs directly communicating with each other are connected to a base station.
Figure 3:
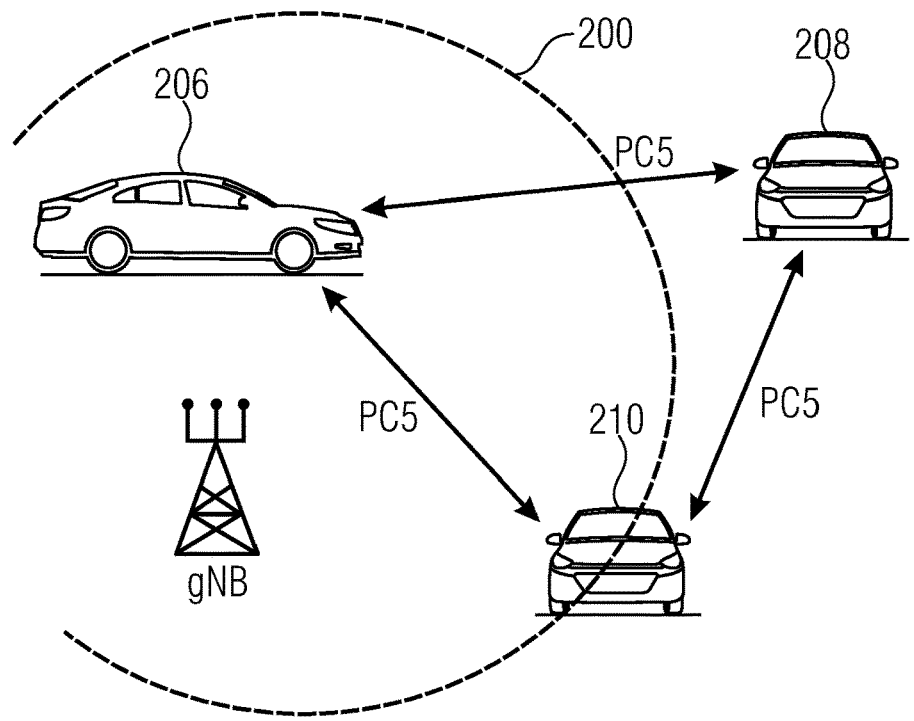
FIG. 3 is a schematic representation of an out-of-coverage scenario in which UEs directly communicating with each other receive no SL resource allocation configuration or assistance from a base station.
Figure 4:
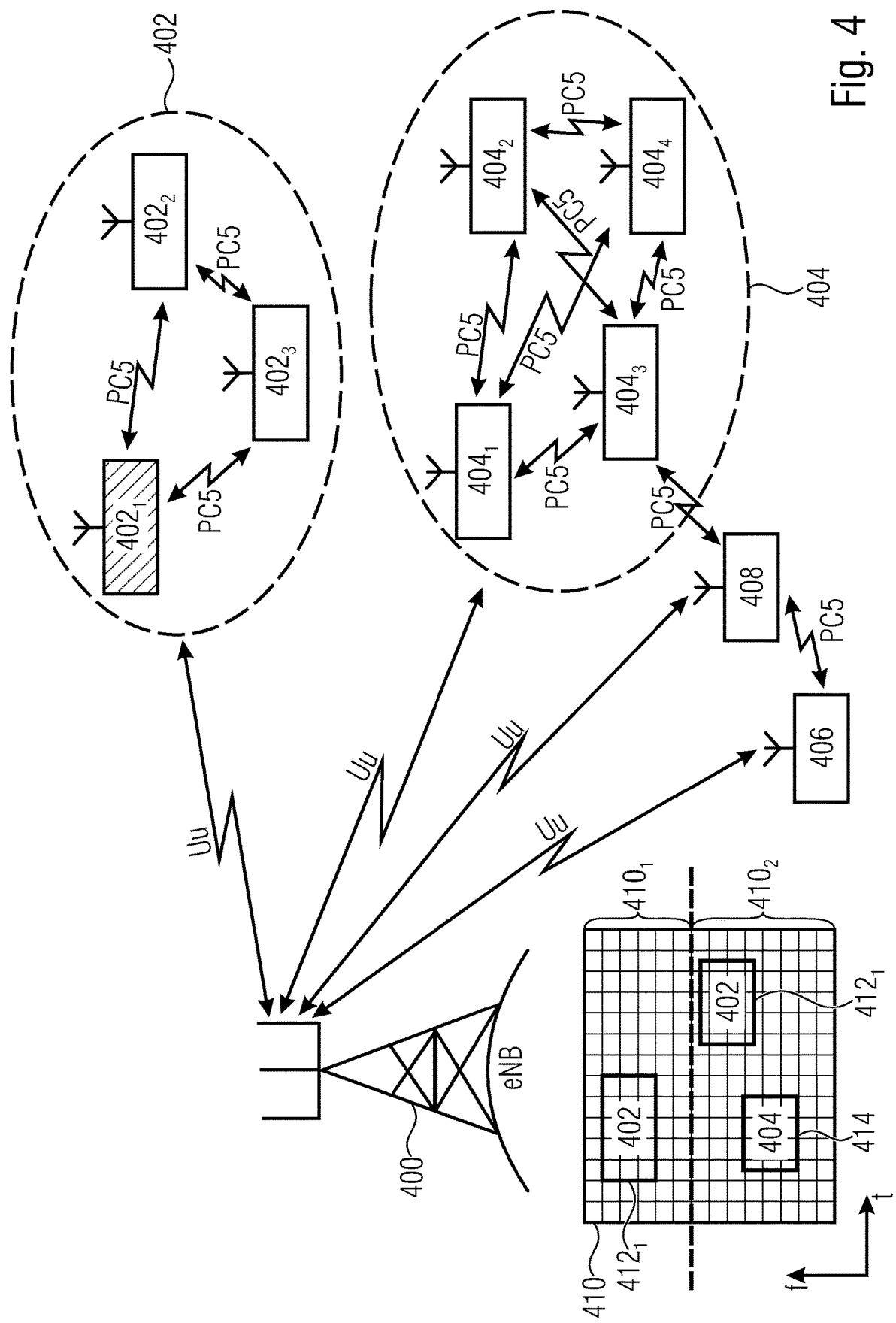
FIG. 4 is a schematic representation of a part of the wireless communication network, like the one of FIG. 1, for describing the concept of providing a set of resources to be exclusively used for a groupcast communication.

FIG. 4 is a schematic representation of a part of the wireless communication network, like the one described with reference to FIG. 1, and illustrates a cell of the network mentioned above or one of a plurality of radio access networks available in such a wireless communication network. FIG. 4 illustrates a base station 400 and a plurality of user devices, UEs. Some of the UEs are grouped into respective user device groups 402 and 404, while other UEs, like UEs 406 and 408 are not members of any group. The first group 402 includes, in accordance with the depicted example, three UEs $402_1$ to $402_3$, and within the group 402, the UEs $402_1$ to $402_3$ may communicate with each other using a sidelink interface, like the PC5 interface. The group 404 includes four UEs $404_1$ to $404_4$ which, like the UEs in the first group 402 communicate among each other using the sidelink communications via the sidelink interface, like the PC5 interface. The UEs within groups 402, 404 and the UEs 406, 408 may further communicate directly with the base station 400 using, for example, the Uu interface. Within the respective groups 402, 404, one of the UEs, some of the UEs or all of the UEs may communicate directly with the base station 400.

Also, UEs 406 and 408, which are not members of any group, may communicate with each other or with any other UE using the sidelink interface, like the PC5 interface.

For the sidelink communication a set of resources 410 is provided from which resources may be allocated to the respective UEs for transmitting data. The set of resources 410 is also referred to as a mini resource pool, a mini resource pool (mRP) or a sub-pool. For example, the resources 410 include a time/frequency/space resource grid, and from the resources 410 a subset of resources are selected by the base station 400 (for UEs in NR mode 1) or by the UEs (for UEs in NR mode 2) for allocation to the respective UEs for a communication over the sidelink interface. In the example of FIG. 4, the base station 400 provides for the first group 402 two sets of resources or two mini resource pools $412_1$ and $412_2$ which include the resources from the overall resource pool 410 to be used for the sidelink communication within the group 402. For the second group 404, the base station 400 provides a second resource pool 414. It is noted that the present invention is not limited to the depicted embodiment, rather, there may be only a single group of UEs or there may be more than the two depicted groups. Also, the number of UEs forming the group is not limited to the depicted embodiments, rather, any number of UEs may be grouped together. Also, there may be situations in which all UEs are a member of a group and in such scenarios UEs 406 and 408 may not be present or may belong to one or more groups. Also, the number of mini resource pools 412, 414 reserved or provided for the respective groups may be different, for example, the base station may provide less or more mini resource pools for the group 402 or more than one resource pool 414 for the second group 404.

FIG. 4 illustrates an example in which the resource pool comprises a plurality of continuous resources across a frequency domain and adjacent across the time domain, however, the invention is not limited to such configurations, rather, in accordance with other embodiments, the respective resources forming a resource pool may be non-continuous resources across the frequency domain and/or non-adjacent resources across the time domain. Note that resources may also be allocated over the spatial domain utilizing multiple input multiple output (MIMO)-processing at the base station and/or at the UE. The spatial domain may be used in combination with both frequency and/or time domains. The resource pool may include a plurality of groups of resources including at least a first group and a second group, the first and second group having different numerologies, like a different subcarrier spacing, a different slot length or a different number of supported channels. For example, dependent on a quality of service, QoS, requirement, resources to be allocated may be selected from a mini resource pool with the numerology used for meeting the QoS requirements of a mobile communication system, e.g. such as a 5G system (5GS). In accordance with other embodiments, the resource pool may include groups of resources with different numerologies, for example, a first group having a first numerology, as indicated at $410_1$, and a second group with a second numerology as indicated at $410_2$. For example, for group 402, the base station provides the mini resource pool 412 including resources from the first group of resources $410_1$ and from the second group of resources $410_2$. The groups of resources with different numerology may employ different subcarrier spacings (SCS), and the respective one or more groups of resources may be referred to as bandwidth parts.

In mobile communication systems, such as 3GPP's New Radio (NR), data duplication may be used to increase the reliability of a data transmission from a base station (BS) or gNB (in NR) to the user equipment (UE). This link is referred to as the Uu link. Currently in NR, data duplication is supported for unicast traffic on the Uu link only. In LTE systems, data duplication is also supported for LTE-V2X, however, only broadcast transmissions are supported. In LTE-V2X, for transmission, the MAC layer (Layer 2) parameters for performing data duplication may be derived from the QoS input. The decision whether to perform duplication or not may be derived from the packet per packet priority (PPPP) value and/or from the packet per packets reliability (PPPR) value. Duplication is then performed on the PDCP (packet data convergence protocol) layer.

NR V2X also provides a sidelink interface, similar as in LTE. NR V2X supports, similar to LTE V2X, a mode which operate in-coverage of a base station (NR mode 1), or a mode that allows V2X UEs to operate out-of-coverage (NR mode 2). Furthermore, NR V2X supports unicast, groupcast, multicast and broadcast transmission modes. The reliability to be achieved for each transmission mode may vary. For example, the transmission modes unicast and groupcast may use link adaptation and thus have a higher spectral efficiency than a broadcast transmission. In addition, the reliability requirement may be larger for one transmission mode as for another. Also, for implementing certain applications or services, which entail, e.g., ultra-reliable low latency communications (URLLC), data duplication may be configured, e.g., either unicast or groupcast transmission.

However, for providing such applications or services also via the sidelink, the problem is that if data duplication is not supported for the sidelink or sidelink communication, the used ultra-reliable low latency communications (URLLC) may not be achieved.

Figure 5:
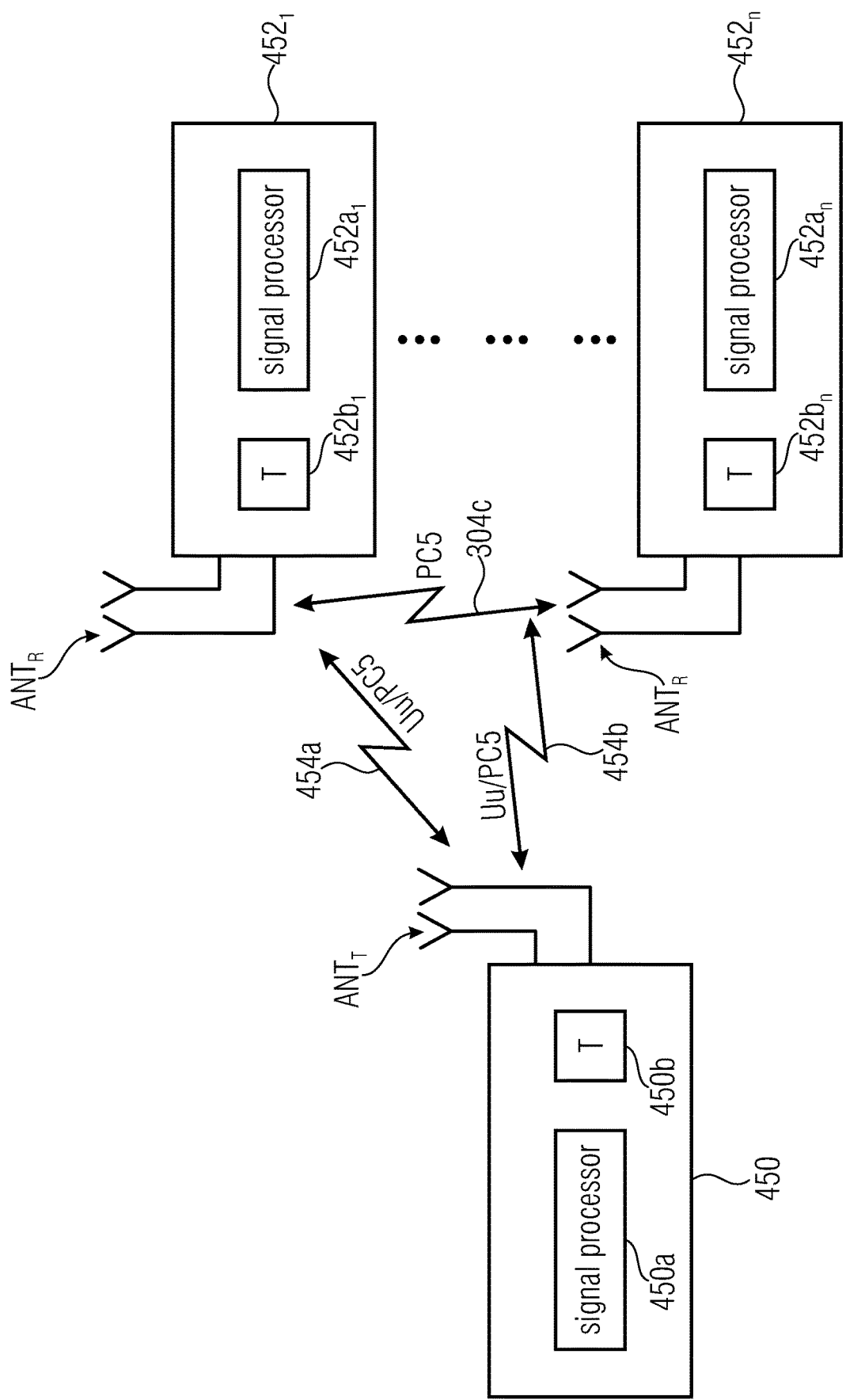
FIG. 5 is a schematic representation of a wireless communication system for communicating information between a transmitter and one or more receivers in accordance with embodiments of the present invention.

The present invention addresses the above issues by providing improvements in the communication over the sidelink. Embodiments of the present invention may be implemented in a wireless communication system as depicted in FIG. 1, FIG. 2, FIG. 3 and FIG. 4 including base stations and users, like mobile terminals or IoT devices. FIG. 5 is a schematic representation of a wireless communication system including a transmitter 450, like a base station, and one or more receivers 452$_1$ to 452$_n$, like user devices, UEs. The transmitter 450 and the receivers 452 may communicate via one or more wireless communication links or channels 454a, 454b, 454c, like a radio link. The transmitter 450 may include one or more antennas ANT$_T$ or an antenna array having a plurality of antenna elements, a signal processor 450a and a transceiver 450b, coupled with each other. The receivers 452 include one or more antennas ANT$_R$ or an antenna array having a plurality of antennas, a signal processor 452a$_1$, 452a$_n$, and a transceiver 452b$_1$, 452b$_n$ coupled with each other. The base station 450 and the UEs 452 may communicate via respective first wireless communication links 454a and 454b, like a radio link using the Uu interface, while the UEs 452 may communicate with each other via a second wireless communication link 454c, like a radio link using the PC5 interface. When the UEs are not served by the base station, are not be connected to a base station, for example, they are not in an RRC connected state, or, more generally, when no SL resource allocation configuration or assistance is provided by a base station, the UEs may communicate with each other over the sidelink. The system, the one or more UEs 452 and the base stations may operate in accordance with the inventive teachings described herein.

Wireless Communication System

The present invention provides (see for example claim 1) wireless communication system, comprising:
a plurality of user devices, UEs, configured for a sidelink communication using resources from a set of sidelink resources of the wireless communication system,
wherein the plurality of UEs comprises at least one transmitting UE and at least one receiving UE, the transmitting UE and the receiving UE configured to use at least a subset of the sidelink resources of the wireless communication system for the sidelink communication, and
wherein the wireless communication system is configured to allow a data duplication on the sidelink, wherein the data duplication on the sidelink is activated or triggered dependent on one or more of
a sidelink quality of the sidelink between the transmitting UE and the receiving UE, and/or
an occupancy of the sidelink resources, and/or
data received by a network element/network function, and/or
the application service running on one of the UEs.

In accordance with embodiments (see for example claim 2), the sidelink communication comprises one or more of
a unicast transmission from the transmitting UE to the receiving UE,
a multicast transmission from the transmitting UE to a plurality of receiving UEs,
a groupcast from the transmitting UE to a plurality of receiving UEs, the transmitting UE and a plurality of receiving UEs forming a group of UEs, and/or
a broadcast transmission by the transmitting UE.

In accordance with embodiments (see for example claim 3), in case of a unicast transmission, data duplication is triggered responsive to one or more of
the link quality, e.g. based on an estimated SNR, reaching or dropping below a first threshold,
a number of decoding failures, e.g., indicated by a HARQ feedback, reaching or exceeding a second threshold,
an interference, e.g. based on interference originating from other UEs or gNBs, reaching or exceeding a third threshold,
an occupancy of the sidelink resources, e.g., resources allocated for unicast transmissions.

In accordance with embodiments (see for example claim 4), in case of a groupcast or a multicast transmission, data duplication is triggered responsive to one or more of
the link quality of the whole group of UEs, e.g., based on all links between all group members, or of a subset of UEs of the group, or of a single UE group member reaching or dropping below a first threshold,
an accumulated number of decoding failures, e.g., indicated by a HARQ feedback from one or more of the UEs of the group, reaching or exceeding a second threshold,
an interference reaching or exceeding a third threshold, e.g., an interference experienced by a UE group member, like an interference experienced by a group leader (GL) UE, or an interference experienced by a subset of UEs of the group, or an interference experienced by all UE group members,
an occupancy of the sidelink resources, e.g., resources allocated for groupcast transmissions.

In accordance with embodiments (see for example claim 5), in case of a broadcast transmission, data duplication is triggered responsive to one or more of
the link quality, e.g. based on an estimated SNR or SINR, reaching or dropping below a first threshold,
an interference, e.g. based on interference originating from other UEs or gNBs, reaching or exceeding a second threshold,
an occupancy of the sidelink resources, e.g., resources allocated for broadcast transmissions.

In accordance with embodiments (see for example claim 6), the wireless communication system is configured to activate or trigger the data duplication on the sidelink responsive to a feedback, the feedback
including one or more parameters associated with the link quality and/or the occupancy, or being a function of one or more parameters associated with the link quality and/or the occupancy.

In accordance with embodiments (see for example claim 7), the feedback being a function of one or more parameters associated with the link quality and/or the occupancy provides
an absolute link quality index, or
a relative link quality index indicating that a more/less robust transmission scheme is needed In accordance with embodiments (see for example claim 8), the feedback is a function of one or more a link quality, a HARQ failure rate, a channel busy ratio, interference conditions, and the like.

In accordance with embodiments (see for example claim 9), the link quality is measured or estimated based on one or more of
an estimated SNR,
a SINR,
a CSI measurement report,
a sounding reference signal (SRS) measurement,
a power measurement, e.g. power of a single beam or set of beams,
a MIMO feedback, like a rank or preferred matrix indicator (PMI) of a precoding matrix,
a channel busy ratio (CBR),
a decoder state information (DSI).

In accordance with embodiments (see for example claim 10), in case the transmitting and receiving UEs are in-coverage,
a base station of the wireless communication system is configured to provide a set of configurations with different parameters, the set of configurations including a first configuration causing the data duplication to be switched-on and a second configuration causing the data duplication to be switched-off,
the UEs are configured to provide the feedback information to the base station, the feedback being send by the transmitting UE directly to the base station or by the receiving UE to the base station directly, via the transmitting UE or via a further UE, and
responsive to the feedback, switching-on or switching-off the data duplication is signaled, e.g., directly or via a change of configuration.

In accordance with embodiments (see for example claim 11), in case the transmitting and receiving UEs are out-of-coverage,
the UEs are pre-configured with a set of configurations with different parameters, the set of configurations including a first configuration causing the data duplication to be switched-on and a second configuration causing the data duplication to be switched-off,
the UEs are configured to provide the feedback information via the sidelink, e.g., via a sidelink feedback channel or via a sidelink RRC, and
responsive to the feedback, switching-on or switching-off the data duplication is signaled, e.g., directly or via a change of configuration.

In accordance with embodiments (see for example claim 12), the pre-configuration of a UE depends on one or more of
a higher layer input, e.g., QoS or application layer input or input received from a network element,
a lower layer input, e.g., PHY measurements, like an interference condition or a channel busy ratio (CBR), and/or the pre-configuration of a UE is included in the UE, e.g., stored in a firmware of the UE or hardwired in the UE or provided as a factory setting, and/or
results from one or more pre-configurations when the UE had been in-coverage in a previous situation, wherein a pre-configuration may be associated with a timer so that upon expiry of the timer the configuration falls back to the factory setting or a different pre-configuration stored in the firmware of the UE or hardwired in the UE.

In accordance with embodiments (see for example claim 13), the wireless communication system is configured to determine, upon establishing or initializing the sidelink, whether the data duplication on the sidelink is to be activated or is not to be activated, e.g., by querying the transmitting UE and/or the receiving UE whether the current configuration supports the data duplication.

In accordance with embodiments (see for example claim 14), the wireless communication system is configured to measure the sidelink repeatedly following the establishment, and, responsive to the measurements of the sidelink, cause switching-on a deactivated data duplication or switching-off an activated data duplication, e.g., directly or via a change of configuration.

In accordance with embodiments (see for example claim 15), the measurements of the sidelink comprise measurements of one or more of the following:
CBR,
occupancy report, e.g., general or for an applicable resource pool for a current link,
link quality to the receiving UE, wherein the link quality may be measured or estimated using the parameters listed in claim 9,
interference situation at the receiving UE.

In accordance with embodiments (see for example claim 16), dependent on a coverage state of a particular UE, in-coverage or out-of-coverage, and/or dependent on a configuration of the data duplication, the configuration or signaling to activate or deactivate the data duplication originates from different entities, e.g. an activation may originate from a base station and/or from a road side unit, and a deactivation may originate from another SL UE from a base station, and/or from a network entity.

In accordance with embodiments (see for example claim 17),
the wireless communication system is to configure or signal the switching-on or switching-off the data duplication via the RRC layer or over the top (OTT) and indirectly via the RRC layer,
in case the transmitting and receiving UEs are in-coverage, a configuration for switching-on or switching-off the data duplication may be signaled from a base station using RRC signaling via the Uu interface or from another UE via a sidelink RRC message, and/or
in case the transmitting and receiving UEs are out-of-coverage, a configuration for switching-on or switching-off the data duplication may be signaled via a sidelink RRC message.

In accordance with embodiments (see for example claim 18),
the RRC layer configures the data duplication and activates or deactivates the data duplication, or
the RRC layer configures the set of configurations at least one of which allows the data duplication, wherein switching of the configurations may be done via RRC or DCI signaling, or the RRC configuration is a part of a semi-persistent-scheduling (SPS)—configuration, e.g. a grant-free type I or type II configuration.

In accordance with embodiments (see for example claim 19), the configuration includes two or more SPS configurations to be switched on/off dynamically so that data duplication is not performed when only one of the SPS configurations is activated or switched on, and data duplication is performed when both SPS configurations are activated or switched on.

In accordance with embodiments (see for example claim 20), the data duplication is located at the PDCP layer, a transmitting UE duplicates a packet and performs packet routing, and the one or more receiving UEs perform duplication detection or are configured to perform duplication detection and discarding packets.

In accordance with embodiments (see for example claim 21), the on/off-switching of the data duplication is handled by the MAC layer, e.g., by using MAC control elements, and/or the on/off-switching of the data duplication is handled by the PHY layer, e.g. via DCI.

In accordance with embodiments (see for example claim 22), the transmitting UE and/or the receiving UE is configured to apply an algorithm for determining, using parameters of the wireless communication network and received or measured link quality indicators, whether data duplication it to be activated or deactivated.

In accordance with embodiments (see for example claim 23), the transmitting UE and/or the receiving UE is configured to determine further whether HARQ is enabled/disabled and select on the PHY one of more of:
MCS,
Power,
RP that is used,
sensing and resource selection behavior,
measurements to perform, e.g., extent and/or periodicity and/or duration.

In accordance with embodiments (see for example claim 24), the parameters of the wireless communication network and the received or measured link quality indicators include one or more of:
pre-configured parameters from the network, e.g. permissions, limits that need to be respected by the UE, which may depend on QoS, traffic type and which may differ depending on a resource pool, RP, used,
own measurements, e.g. CBR, link quality measurements on feedback or reference symbols received,
received measurements, e.g. RSRP, CQI, CSI, SNR, SINR, SRS,
traffic type, e.g. QoS, SPS/one shot transmissions (OS), packet size, periodicity.

In accordance with embodiments (see for example claim 25), the wireless communication system is configured to deactivate or not activate the data duplication in case one or more of the following criteria are not met:
the priority is higher than a certain threshold,
the entailed latency is higher than a certain threshold,
the data rate is higher than a certain threshold,
the link quality is better than a certain threshold,
the service class is below a certain threshold.

In accordance with embodiments (see for example claim 26), the wireless communication system is configured to not use the data duplication when a sidelink is established, but to turn on the data duplication responsive to meeting a certain condition, e.g., if a certain threshold of HARQ retransmissions is reached or exceeded or e.g. the packet loss is larger than a certain threshold.

In accordance with embodiments (see for example claim 27), the wireless communication system comprises a hard-coded/defined/pre-configured set of standardized sidelink services, like V2X services, e.g., selected based on 5QI or VQI, for which a data duplication configuration is loaded and used.

In accordance with embodiments (see for example claim 28), the wireless communication system is configured to activate/deactivate the data duplication dependent on a RP, a mini RP (mRP), a BWP, a carrier, a RAT or a frequency range that the UEs operate in.

In accordance with embodiments (see for example claim 29), responsive to activating the data duplication, the transmitting UE is configured to transmit a plurality of different versions of one or more data packets over the sidelink to the receiving UE, wherein transmitting different versions of the data packet comprises one or more of:
(i) transmitting the data packet itself, or
(ii) transmitting one or more duplicates of the data packet, or
(iii) transmitting one or more redundancy versions of the data packet, or
(iv) transmitting one or more erasure correction codes for the data packet, or
(v) a combination of any of (i) to (iv).

In accordance with embodiments (see for example claim 30), the one or more redundancy versions provide for an incremental redundancy at a receiver.

In accordance with embodiments (see for example claim 31), the sidelink resources include at least a first group of resources having a first numerology and a second group of resources having a second numerology, the first and second numerologies being different.

In accordance with embodiments (see for example claim 32), the set of sidelink resources and/or the subset set of sidelink resources comprises a plurality of contiguous or non-contiguous resources across a frequency domain and adjacent or non-adjacent across a time domain.

In accordance with embodiments (see for example claim 33), the set of sidelink resources defines one or more of:
a resource pool (RP),
a mini-resource pool (mRP),
a band width part, BWP, in a resource pool,
a resource pool in a BWP.

In accordance with embodiments (see for example claim 34), the plurality of UEs comprise one or more of a mobile terminal, or stationary terminal, or cellular IoT-UE, or vehicular UE, or a group leader UE (GL), or an IoT or narrowband IoT, NB-IoT, device, or a ground based vehicle, or an aerial vehicle, or a drone, or a moving base station, or road side unit (RSU), or a building, or any other item or device provided with network connectivity enabling the item/device to communicate using the wireless communication network, e.g., a sensor or actuator.

In accordance with embodiments (see for example claim 35), the base station comprises one or more of a macro cell base station, or a small cell base station, or a central unit of a base station, or a distributed unit of a base station, or a road side unit, or a UE, or a group leader (GL), or a relay or a remote radio head, or an AMF, or an SMF, or a core network entity, or mobile edge computing entity, or a network slice as in the NR or 5G core context, or any transmission/reception point, TRP, enabling an item or a device to communicate using the wireless communication network, the item or device being provided with network connectivity to communicate using the wireless communication network.

Base Station

The present invention provides a base station for a wireless communication system of any one of the preceding claims.

The present invention provides (see for example claim 36) a base station for a wireless communication system, the wireless communication system including a plurality of user devices, UEs, configured for a sidelink communication using resources from a set of sidelink resources of the wireless communication system, wherein the plurality of UEs comprises at least one transmitting UE and at least one receiving UE, the transmitting UE and the receiving UE configured to use at least a subset of the sidelink resources of the wireless communication system for the sidelink communication, wherein the base station is configured to allow a data duplication on the sidelink, wherein the data duplication on the sidelink is activated or triggered dependent on one or more of a sidelink quality of the sidelink between the transmitting UE and the receiving UE, and/or an occupancy of the sidelink resources, and/or data received by a network element/network function, and/or the application service running on one of the UEs.

User Device

The present invention provides a user device, UE, for a wireless communication system of any one of the preceding claims.

The present invention provides (see for example claim 37) a user device, UE, for a wireless communication system, the wireless communication system including a plurality of user devices, UEs, configured for a sidelink communication using resources from a set of sidelink resources of the wireless communication system, wherein the UE is a transmitting UE and is configured to use at least a subset of the sidelink resources of the wireless communication system for the sidelink communication with at least one receiving UE, wherein the UE is configured to allow a data duplication on the sidelink, wherein the data duplication on the sidelink is activated or triggered dependent on one or more of a sidelink quality of the sidelink between the transmitting UE and the receiving UE, and/or an occupancy of the sidelink resources, and/or data received by a network element/network function, and/or the application service running on one of the UEs.

Methods

The present invention provides a method for operating a wireless communication system of any one of the preceding claims.

The present invention provides (see for example claim 38) a method for operating a wireless communication system, the wireless communication system including a plurality of user devices, UEs, configured for a sidelink communication using resources from a set of sidelink resources of the wireless communication system, wherein the plurality of UEs comprises at least one transmitting UE and at least one receiving UE, the method comprising:

performing a sidelink communication between the transmitting UE and the receiving UE using at least a subset of the sidelink resources of the wireless communication system, allowing a data duplication on the sidelink, wherein the data duplication on the sidelink is activated or triggered dependent on one or more of a sidelink quality of the sidelink between the transmitting UE and the receiving UE, and/or an occupancy of the sidelink resources, and/or data received by a network element/network function, and/or the application service running on one of the UEs.

Computer Program Product

The present invention provides a computer program product comprising instructions which, when the program is executed by a computer, causes the computer to carry out one or more methods in accordance with the present invention.

Thus, embodiments of the present invention provide improvements in the communication over the sidelink, e.g., NR V2X reliability enhancements, by specifying how data duplication on the sidelink is configured. If data duplication is associated with the link quality of the particular sidelink, the inventive mechanisms may be triggered or switched on/off based on the link quality. This may be handled depending on the transmission mode, e.g. unicast or groupcast or multicast or broadcast transmission. Furthermore, the transmission modes unicast, groupcast, multicast and broadcast may also be referred to as x-cast.

In accordance with embodiments, data duplication may transmit an exact copy of the said data. For example, the robustness of a transmission may be increased by making such an exact copy and transmitting this over another channel. This may be the easiest approach for implementing data duplication on the sidelink, and it may only entail additional memory on the given device or a simple transmission procedure, which points to the exact same memory position on the device performing data duplication. In accordance with other embodiments, a modified version of the copy may be provided, e.g. by recoding a particular data portion. This may be also referred to as redundancy transmission which may be performed on different layers, e.g. PHY, MAC, radio link control (RLC) layer, application layer. On the PHY layer, this may be achieved by choosing a different MCS level or code rate or redundancy version (RV) or a different frequency or temporal spreading. On the MAC layer, this may be achieved by using a different coding scheme such as rateless codes, and on the application layer this may be performed by choosing an application-layer FEC.

In accordance with embodiments, the trigger to perform or allow data duplication on the sidelink may depend on one or more of a sidelink quality of the sidelink between the transmitting UE and the receiving UE, and/or an occupancy of the sidelink resources, and/or data received by a network element/network function, e.g., a QoS requirement of a network slice, an over-the-top signaling from the Internet, or an application layer of the UE, and/or the application service running on one of the UEs.

In accordance with embodiments, the trigger to perform data duplication is different depending on the transmission mode (unicast, groupcast, multicast, broadcast). For example, in unicast, data duplication may be triggered based on one or more of the following:
- the link quality, e.g. based on the estimated SNR, drops below a certain threshold,
- the HARQ feedback indicates an increased number of decoding failures,
- an increased interference condition is identified, e.g. based on interference originating from other UEs or gNBs,
- an occupancy of the sidelink resources, e.g., resources allocated for unicast transmissions.

In groupcast or multicast, data duplication data duplication may be triggered based on one or more of the following:
- the link quality of the whole group (all links between all group members) or a subset of UEs from that given group or a single UE group member drops below a certain threshold,
- the accumulated HARQ feedback from n UEs belonging to the same group reaches a defined threshold,
- an increase in interference to a member of the group, e.g., an interference to the group leader (GL) UE, an interference to a subset of UEs from a given group or an interference caused to all group member UEs,
- an occupancy of the sidelink resources, e.g., resources allocated for groupcast or multicast transmissions.

In broadcast, e.g., based on the link quality and/or the interference condition, and/or an occupancy of the sidelink resources, e.g., resources allocated for broadcast transmissions (similar as in in unicast but without any feedback), the UE may decide when to trigger data duplication based on its own measurements.

Feedback

In accordance with embodiments, data duplication on the sidelink may be activated or triggered responsive to a feedback for the sidelink. A feedback may be provided in in unicast and groupcast/multicast transmission mode but nor in broadcast transmission mode.

The feedback including, e.g., the link quality, the HARQ failure rate and the like, may be signaled as one or more the parameters mentioned above. Alternatively, feedback may be a function (f) of a plurality of such parameters, e.g.
- f(link quality, HARQ failure rate, CBR, interference conditions, etc.) so as to provide an absolute link quality index, or
- f(link quality, HARQ failure rate, CBR, interference conditions, etc.) so as to provide a relative link quality index (delta(link quality index)) indicating that a more robust or less robust transmission scheme is needed.

In accordance with embodiments, one or more of the following parameters or values may be used to measure the link quality
- a SINR,
- a CSI measurement report,
- a sounding reference signal (SRS) measurement,
- a power measurement, like power of a single beam or set of beams, e.g. if a UE may use beamforming, the quality of a given beam may be measured and data duplication may be triggered accordingly,
- a MIMO feedback, like a rank or preferred matrix indicator (PMI) of a precoding matrix,
- a channel busy ratio (CBR),
- a decoder state information (DSI).

In accordance with embodiments, in case of a groupcast transmission, how to configure and utilize data duplication on the sidelink may depend on whether the group of UEs is in-coverage of a gNB or a road side unit (RSU) or out-of-coverage.

In-Coverage-Scenario

The configuration of the data duplication on the sidelink may be performed by the gNB by providing a set of configurations with different parameters. For example, in one configuration or configuration template, the data duplication may be configured as "switched-on", and in another configuration the data duplication may be configured as "switched-off".

The feedback information may be provided by a UE which forwards the feedback to the gNB. The feedback may be sent by a SL transmitting UE or a SL receiving UE to the gNB. The SL receiving UE may transmit the feedback to the gNB via the Uu link or via the transmitting UE. The feedback may also be relayed via a third UE or entity, e.g. a road side unit (RSU) or a group leader (GL).

The trigger to switch-on or -off data duplication may be signaled directly or via a change of the configuration. The duplication trigger may happen independently on a pre-configured set of parameters.

Out-of-Coverage Scenario

The configuration of the data duplication on the sidelink may be performed using a set of configurations with different parameters. For example, in one configuration or configuration template, the data duplication may be configured as "switched-on", and in another configuration the data duplication may be configured as "switched-off". The one or more configurations for the data duplication on the sidelink may be pre-configured, e.g., dependent on one or more of
- a higher layer input, e.g., QoS or application layer input or input received from a network element,
- a lower layer input, e.g., PHY measurements, like an interference condition or a channel busy ratio (CBR), The pre-configuration of the UE may be obtained or result from one or more pre-configurations when the UE had been in-coverage in a previous situation and/or may be included in the UE, e.g., stored in a firmware of the UE or hardwired in the UE. In accordance with embodiments, the pre-configurations when the UE had been in-coverage may be associated with a timer so that upon expiration of the timer of a pre-configuration, the UE may fall back to a factory setting or to a different pre-configuration stored in a firmware of the UE.

The feedback information may be provided via the sidelink by the receiving UE, another transmitting UE or a group leader (GL) UE, e.g., via a sidelink feedback channel or via a sidelink RRC.

The trigger to switch-on or to switch-off the data duplication may be signaled directly or via a change of the configuration (e.g., from another UE). The duplication trigger may happen independently on a pre-configured set of parameters.

Signaling

In accordance with embodiments, a signaling is provided for the configuration of the data duplication. This signaling may also be used to activate/deactivate the data duplication mechanism. Based on the above described feedback the configurations may be selected and it may be determined whether the data duplication is active or inactive.

Initialization

A sidelink may be established by higher layers (PC5-S or PC5-RRC), and one or more of the following link parameters may be provided by the higher layers:

QoS Parameters: PPPP, PPPR, 5QI
periodicity/event triggered
data rate demands, e.g. quota
destination: unicast, groupcast, broadcast
range (applicable at least to Broadcast)

If the UE is in-coverage, a request is sent from the application to the network to provide resources to satisfy and enable the requirements. The final decision is in the network and may be assisted by measurement reports requested from one or more sidelink UEs (transmitter, receiver or a third UE). A message on SL UE information is send to the gNB including the requested link parameters. The gNB sends back respective configurations, one or more per requested service/link. Additional measurement reports may be sent repeatedly to the gNB, and the gNB may cause a dynamic switching and reconfiguration. The measurements of the sidelink may include measurements of one or more of the following:

CBR,
occupancy report, e.g., general or for an applicable resource pool for a current link,
link quality to the receiving UE,
interference situation at the receiving UE.

If the UE is out-of-coverage, link parameters originate from the application. During the setup certain stopping criteria may be defined indicating that the requested link may currently not be supported. This decision may be taken by a pre-configured algorithm in the transmitter UE or another UE, e.g. a GL UE. The stopping criteria may be derived from the above-mentioned measurements on the sidelink (SL).

Configuration

As mentioned above, the data duplication may be configured directly by the gNB if a UE is in-coverage. If the UE out-of-coverage, the data duplication may be pre-configured in the UE, or pre-configured by a gNB if the particular UE was in-coverage at a previous point in time. The configuration may be done the via RRC layer or over the top (OTT) and indirectly via the RRC layer. If the UE is in-coverage, either a direct RRC signaling via the Uu ling from a gNB or a sidelink RRC signaling via another UE may be used to configure the data duplication. In case of RRC signaling, if the UE is out-of-coverage, the configuration may be signaled via a sidelink RRC message.

In accordance with embodiments, the RRC layer configures the data duplication and activates or deactivates the data duplication or configures the set of configurations at least one of which allows the data duplication, wherein switching of the configurations may be done via RRC or DCI signaling. In accordance with other embodiments, the RRC configuration is a part of a semi-persistent-scheduling (SPS) configuration, e.g. a grant-free type I or type II configuration that may be supported by the NR sidelink interface.

Dependent on the coverage state of a particular UE (in-coverage or out-of-coverage) and/or dependent on the chosen configuration for data the duplication, the configuration to activate or deactivate the data duplication may come from or may be provided by different entities, e.g., an activation may come from a gNB and a deactivation may come from another UE with sidelink, or an activation may come from a RSU and a deactivation mac come from a gNB.

Figure 6:
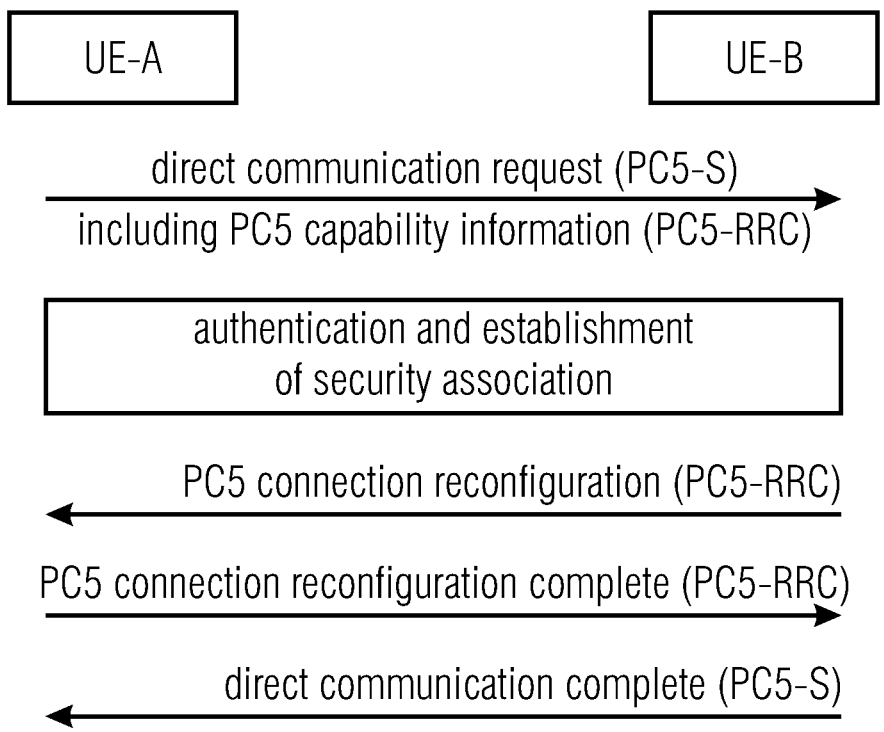
FIG. 6 schematically illustrates an example for setting up a sidelink or direct configuration for a unicast transmission between a two UEs.

In the following, an example for the activation/deactivation of the data duplication is described for a direct configuration (UE-to-UE). FIG. 6 schematically illustrates an example for setting up a sidelink or direct configuration for a unicast transmission between a UE-A and a UE-B using respective SL resources. UE-A initially sends the request for the direct communication, e.g., the PC5-S, to UE-B. After successful authentication UE-B sends to UE-A the PC5 connection reconfiguration so as to configure UE-A for the SL communication with UE-B. After having received from UE-A the confirmation that the reconfigurations is completed, UE-B confirms that the link setup for direct communication to UE-A is completed. In accordance with embodiments, during the initial connection setup, UE-A may signal in its PC5 capabilities, if it supports data duplication or not.

At this time, there are no direct sidelink (SL) measurement reports provided, however, to allow for the configuration of the data duplication over the SL embodiments of the present invention provide direct sidelink (SL) measurement reports, e.g., one or more of the following reports an interference report, used, e.g., for selecting/switching of resources accordingly
a SINR report, used, e.g., for adjusting of MCS/Tx power/enabling duplication
a feedback, e.g., CSI or CQI
a RSRP/RSRQ feedback
a HARQ failure reporting, used, e.g., for adjustments in case the HARQ fails too often.

The above measurement may be performed during connection setup, e.g., the PC5-S request from UE-A (see FIG. 6) may be used by UE-B to perform initial link quality measurements. The initial link quality measurements may be reported in the PC5-RRC reconfiguration message from UE-B or a recommended configuration may be sent back to UE-A. UE-A may then reply with a configuration or acknowledge the recommended configuration. In accordance with other embodiments, the link measurements during connection setup may be triggered and or reported by other messages. Based on the measurements and in case the UEs support the data duplication, UE-B may decide whether the data duplication is to be activated or not.

In the following, an example for the activation/deactivation of the data duplication is described for an indirect configuration (BS-to-UE). In accordance with embodiments, the indirect RRC configuration may be done via a modified SL-SPS or a SL-Grant Free configuration from the base station (e.g. a gNB). An explicit or implicit signaling may trigger the data duplication.

Figures 7A, 7B, 7C:
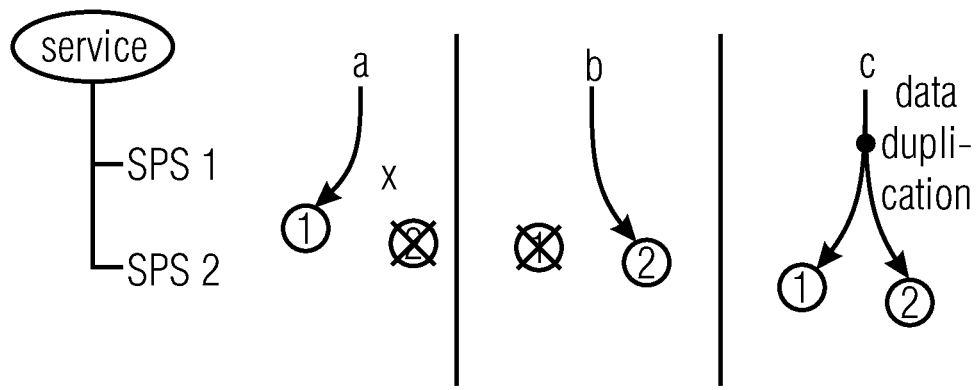
FIGS. 7(a)-7(c) illustrate an embodiment of an implicit trigger of the data duplication using two SPS configurations.

For example, FIG. 7 illustrates an embodiment of an implicit trigger of the data duplication using two SPS configurations SPS1 and SPS2 provided by a service, which may be switched on/off dynamically. If only one of the SPS configurations is switched on, either SPS1 (see FIG. 7(a)) or SPS2 (see FIG. 7(b)) the data or packet duplication is switched of. If both SPS configurations are switched on (see FIG. 7(c)) the data or packet duplication is performed by the PDCP layer.

In accordance with other examples, a new SL grant free configuration field may be provided, which enables the data duplication and causes the provision of two SPS configurations if data duplication is switched on. FIG. 8 illustrates an embodiment of an explicit trigger of the data duplication using the PDCP information including the SL grant free configuration field. If the SL grant free configuration field is inactive or indicates in another way that data duplication is off, one SPS configuration is provided and single no packet duplication is performed by the PDCP layer (see FIG. 8(a)). If the SL grant free configuration field is active or indicates in another way that data duplication is on, two SPS configurations are provided and packet duplication is performed by the PDCP layer (see FIG. 8(b)). If the SL grant free configuration field is active or indicates in another way that data duplication is on, in accordance with another embodiment, rather than providing two SPS configurations, only one SPS configurations is provided, and the other configuration is sensing based, e.g., in a mmWave-band with large bandwidth and low probability of collisions. For example, a resource pool (RP) configuration (as illustrated in FIG. 8(c)) may be used, which may be a BWP or a time frequency repetition pattern (TFRP), or a time frequency resource pattern, or a pool of two dimensional time frequency repetition patterns, or a different radio access technology (RAT), e.g. IEEE 802.11p.

As mentioned above, the data duplication may be located at the PDCP layer. The transmitter duplicates the data or packet and performs packet routing. The one or more receivers perform a duplication detection or are configured to perform a duplication detection and discards packets. In case there is only one receiver, this refers to a unicast operation, and in case there more receivers, this refers to a group-, multi- or broadcast operation.

If configured OTT, the RRC or PDCP layer may receive a message from another entity, e.g., from an application running on the gNB, within the network or via the Internet.

For out-of-coverage, data duplication may be preconfigured or configuration may be done via sidelink RRC from another UE, e.g., a group leader or a RSU with UE functionality. Some parts of the configuration message may be sent via the physical sidelink control channel (PSCCH), and other parts may be sent via a physical sidelink shared channel (PSSCH). If available, a group configuration channel may be used, e.g. a physical sidelink common control channel (PSCCCH) or a physical sidelink groupcast channel (PSGCH). If the sidelink control channel is used, the configuration may be sent via a modified sidelink control information (SCI). If send via SCI, the control message may only indicate a switch message, indicating to switch between the set of pre-configured configurations, or a trigger-on or trigger-off switch indicating whether the data duplication should be used or not.

In accordance with other embodiments, the on/off-switching of the data duplication may be handled by the MAC layer, e.g., by using MAC control elements.

Feedback

When being in-coverage, the feedback may be signaled by one or more UEs directly using a measurement report via RRC. The measurement report may also be signaled via another UE using sidelink RRC and may be forwarded (directly or aggregated) to the gNB via RRC.

When being out-of-coverage, the feedback may be sent via a sidelink feedback channel, e.g. the physical sidelink feedback channel (PSFCH) using a Sidelink Feedback Control Information (SFCI) format for conveying measurement reports.

On the RRC layer the feedback may be sent via sidelink RRC as a measurement report, and embodiments provide a signaling via the physical sidelink control channel or a sidelink RRC or via the Uu to configure the data duplication on the sidelink shared channel, to allow UEs to exchange the information or capability whether a UE performs data duplication or not. Furthermore, if a group leader (GL) UE is available, a GL UE (or RSU) may query UEs via the sidelink interface to indicate whether they perform data duplication or not.

Algorithm

Embodiments of the present invention concern a UE side algorithm to determine the transmission parameters (including PDCP) to use depending on received or measured link quality indicators. The input for the algorithm may include one or more of the following:

pre-configured parameters from the network (e.g., permissions, limits that need to be respected by the UE, e.g., depending on QoS, traffic type and being different depending on the RP used), UE measurements (e.g., CBR, link quality measurements on feedback or reference symbols received), received measurements (e.g. RSRP, CQI, CSI, SNR, SINR, etc.), a traffic type (e.g. QoS, SPS/OS (OS—one shot), packet size, periodicity)

available resources e.g. grants given or sensing based

Dependent on the input, the algorithm may provide one or more of the following outputs:

HARQ is enabled/disabled data duplication is on/off per PHY one or more of the MCS, the Power, the RP that is used, a sensing and resource selection behavior, and measurements to perform (e.g., extent and periodicity).

The algorithm may select appropriate transmission parameters depending on higher layer input about the traffic as well as the link to the receiver. Additional measurements on CBR, interference and occupancy of the resource pool may limit the algorithm's decision to avoid instable behavior and collisions in high usage scenarios. The algorithm may be used iteratively or whenever the inputs change.

As described above, the duplication may increase reliability and the maximum range. However, if the data rate is too high the data duplication may cause congestion. In case of relaxed latency requirements HARQ retransmission (with or without frequency hopping) may be of advantage to the data duplication. Thus, in accordance with embodiments, services above a certain priority and latency requirement are allowed to use duplication. For example, algorithm may decide based on a mixture of parameters, and some parameters or criteria may be predefined for regulating the use of data duplication, e.g. one or more of the following:

the priority is higher than a certain threshold the latency is lower than a certain threshold the data rate is lower than a certain threshold If one or more of these criteria is not met data duplication is not used.

In case the algorithm works iteratively, the data duplication may not be used when a link is established but may be turned on if a certain threshold of, e.g., HARQ retransmissions is exceeded.

In accordance with embodiments, the algorithm may use one or more pre-configured. The mapping table may map one or more of the following parameters:

Link quality

QoS

UE capabilities

CBR to one or more of the following parameters that are then used for transmission:

HARQ is enabled/disabled data duplication is on/off per PHY one or more of the MCS, the Power, the RP that is used, a sensing and resource selection behavior, and measurements to perform (e.g., extent and periodicity)

In accordance with yet other embodiments, a set of standardized services, like V2X service, may be hardcode/defined/pre-configured, for example based on 5QI or VQI, for which a bearer configuration is loaded and used which applies data duplication.

All of the described approaches may differ depending on mRP, RP, BWP, carrier or set of carriers being using in systems supporting carrier aggregation (CA) or dual connectivity (DC), RAT or frequency range that a device operates in. For example, for a service running in the more valuable spectrum below 6 GHz only a single packet is sent. Therefore, the data duplication may be turned off entirely (exceptions may be made for very high priority messages). The UE is not allowed to send duplicate packets there. The UE may however be allowed to duplicate a packet in a higher frequency band (maybe several times) or when using a different RAT (e.g. 802.11p).

General

Embodiments of the present invention have been described in detail above, and the respective embodiments may be implemented individually or two or more of the embodiments may be implemented in combination.

The data duplication may include the transmission of a plurality of different versions of one or more data packets over the sidelink to the receiving UE. Transmitting the different versions of the data packet may include one or more of:
 (i) transmitting the data packet itself, or
 (ii) transmitting one or more duplicates of the data packet, or
 (iii) transmitting one or more redundancy versions of the data packet, e.g., for providing an incremental redundancy at a receiver, or
 (iv) transmitting one or more erasure correction codes for the data packet, or
 (v) a combination of any of (i) to (iv).

In some of the embodiments described above, reference has been made to respective vehicles being either in a mode in which SL resource allocation configuration or assistance is provided by a base station, e.g., the connected mode, also referred to as mode 1 or mode 3 configuration, or vehicles being in a mode in which when no SL resource allocation configuration or assistance is provided by a base station, e.g., the idle mode, also referred to as mode 2 or mode 4 configuration. However, the present invention is not limited to V2V communications or V2X communications, rather it is also applicable to any device-to-device communications, for example non-vehicular mobile users or stationary users that perform a sidelink communication, e.g., over the PC5 interface. Also, in such scenarios, the inventive aspects described above may be employed.

In accordance with embodiments, the wireless communication system may include a terrestrial network, or a non-terrestrial network, or networks or segments of networks using as a receiver an airborne vehicle or a spaceborne vehicle, or a combination thereof.

In accordance with embodiments, a receiver may comprise one or more of a mobile or stationary terminal, an IoT device, a ground-based vehicle, an aerial vehicle, a drone, a building, or any other item or device provided with network connectivity enabling the item/device to communicate using the wireless communication system, like a sensor or actuator. In accordance with embodiments, a transmitter may comprise one or more of a macro cell base station, or a small cell base station, or a spaceborne vehicle, like a satellite or a space, or an airborne vehicle, like a unmanned aircraft system (UAS), e.g., a tethered UAS, a lighter than air UAS (LTA), a heavier than air UAS (HTA) and a high altitude UAS platforms (HAPs), or any transmission/reception point (TRP) enabling an item or a device provided with network connectivity to communicate using the wireless communication system.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Figure 9:
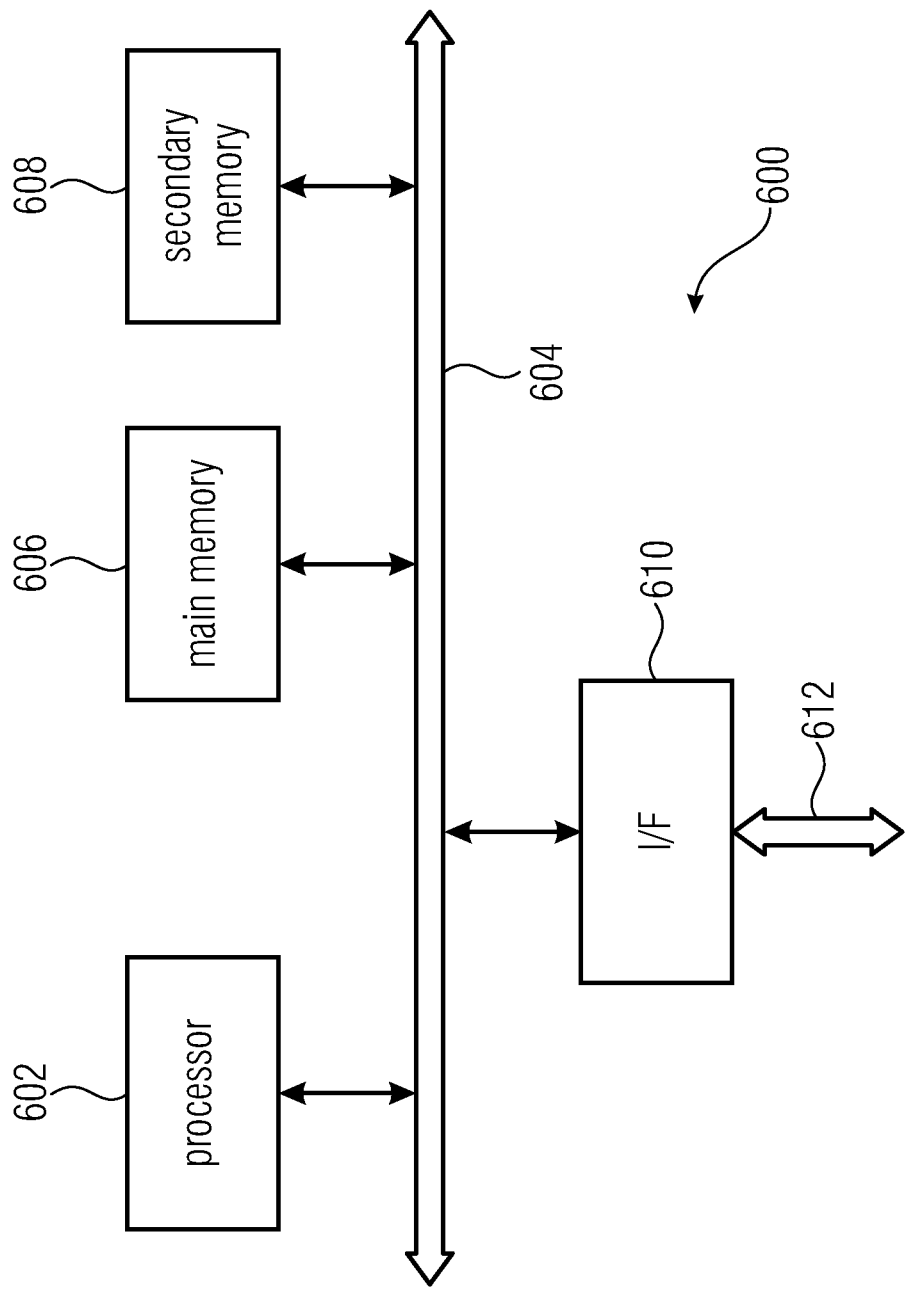
FIG. 9 illustrates an example of a computer system on which units or modules as well as the steps of the methods described in accordance with the inventive approach may execute.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 9 illustrates an example of a computer system 600. The units or modules as well as the steps of the methods performed by these units may execute on one or more computer systems 600. The computer system 600 includes one or more processors 602, like a special purpose or a general purpose digital signal processor. The processor 602 is connected to a communication infrastructure 604, like a bus or a network. The computer system 600 includes a main memory 606, e.g., a random-access memory (RAM), and a secondary memory 608, e.g., a hard disk drive and/or a removable storage drive. The secondary memory 608 may allow computer programs or other instructions to be loaded into the computer system 600. The computer system 600 may further include a communications interface 610 to allow software and data to be transferred between computer system 600 and external devices. The communication may be in the from electronic, electromagnetic, optical, or other signals capable of being handled by a communications interface. The communication may use a wire or a cable, fiber optics, a phone line, a cellular phone link, an RF link and other communications channels 612.

The terms "computer program medium" and "computer readable medium" are used to generally refer to tangible storage media such as removable storage units or a hard disk installed in a hard disk drive. These computer program products are means for providing software to the computer system 600. The computer programs, also referred to as computer control logic, are stored in main memory 606 and/or secondary memory 608. Computer programs may also be received via the communications interface 610. The computer program, when executed, enables the computer system 600 to implement the present invention. In particular, the computer program, when executed, enables processor 602 to implement the processes of the present invention, such as any of the methods described herein. Accordingly, such a computer program may represent a controller of the computer system 600. Where the disclosure is implemented using software, the software may be stored in a computer program product and loaded into computer system 600 using a removable storage drive, an interface, like communications interface 610.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A wireless communication system, comprising:
a plurality of user devices, UEs, configured for a sidelink communication on a sidelink using resources from a set of sidelink resources of the wireless communication system,
wherein the plurality of UEs comprises a transmitting UE and a receiving UE, the transmitting UE and the receiving UE configured to use at least a subset of the set of sidelink resources of the wireless communication system for the sidelink communication,
wherein the wireless communication system is configured to allow a data duplication on the sidelink, wherein the data duplication on the sidelink is activated or triggered dependent on one or more of
a sidelink quality of the sidelink between the transmitting UE and the receiving UE, and/or
an occupancy of the sidelink resources, and/or
data received by a network element/network function, and/or
an application service running on one of the UEs,
wherein the transmitting and receiving UEs are in-coverage or are out-of-coverage,
wherein in case the transmitting and receiving UEs are in-coverage,
a base station of the wireless communication system is configured to provide a set of configurations with different parameters, the set of configurations comprising a first configuration causing the data duplication to be switched-on and a second configuration causing the data duplication to be switched-off,
the UEs are configured to provide feedback information to the base station, the feedback information being sent by the transmitting UE directly to the base station or by the receiving UE to the base station via the transmitting UE or via a further UE, and
responsive to the feedback information, switching-on or switching-off the data duplication is signaled, and
wherein in case the transmitting and receiving UEs are out-of-coverage,
the UEs are pre-configured with the set of configurations with the different parameters, the set of configurations comprising the first configuration causing the data duplication to be switched-on and the second configuration causing the data duplication to be switched-off,
the UEs are configured to provide the feedback information via the sidelink, and
responsive to the feedback information, switching-on or switching-off the data duplication is signaled.

2. The wireless communication system of claim 1, wherein the sidelink communication comprises one or more of
a unicast transmission from the transmitting UE to the receiving UE,
a multicast transmission from the transmitting UE to a plurality of receiving UEs,
a groupcast from the transmitting UE to the plurality of receiving UEs, the transmitting UE and the plurality of receiving UEs forming a group of UEs, and/or
a broadcast transmission by the transmitting UE.

3. The wireless communication system of claim 1, wherein,
in case of a unicast transmission, data duplication is triggered responsive to one or more of
a link quality,
a number of decoding failures,
an interference, and
an occupancy of the sidelink resources,
in case of a groupcast or a multicast transmission, data duplication is triggered responsive to one or more of
a group link quality of a group of UEs,
an accumulated number of decoding failures,
an interference reaching or exceeding a threshold, and
an occupancy of the sidelink resources,
in case of a broadcast transmission, data duplication is triggered responsive to one or more of
the link quality, an interference, based on interference originating from other UEs or gNBs, reaching or exceeding the threshold, and an occupancy of the sidelink resources.

4. The wireless communication system of claim 1, wherein the wireless communication system is configured to activate or trigger the data duplication on the sidelink responsive to the feedback information, the feedback information comprising one or more parameters associated with the sidelink quality and/or the occupancy, or being a function of one or more parameters associated with the sidelink quality and/or the occupancy.

5. The wireless communication system of claim 1, wherein the wireless communication system is configured to determine, upon establishing or initializing the sidelink, whether the data duplication on the sidelink is to be activated or is not to be activated.

6. The wireless communication system of claim 1, wherein, dependent on a coverage state of a particular UE of the plurality of UEs, in-coverage or out-of-coverage, and/or dependent on a configuration of the data duplication, the configuration or signaling to activate or deactivate the data duplication originates from different entities.

7. The wireless communication system of claim 1, wherein the wireless communication system is to configure or signal the switching-on or switching-off the data duplication via a sidelink radio resource control (RRC) layer or over the top and indirectly via the RRC layer, in case the transmitting and receiving UEs are in-coverage, a configuration for switching-on or switching-off the data duplication may be signaled from a base station using RRC signaling via the Uu interface or from another UE via a sidelink RRC message, and/or in case the transmitting and receiving UEs are out-of-coverage, a configuration for switching-on or switching-off the data duplication may be signaled via a sidelink RRC message.

8. The wireless communication system of claim 1, wherein a sidelink radio resource control (RRC) layer configures the data duplication and activates or deactivates the data duplication, or the RRC layer configures the set of configurations at least one of which allows the data duplication, wherein switching of the configurations may be done via RRC or downlink control information (DCI) signaling, or the RRC configuration is a part of a semi-persistent-scheduling (SPS)—configuration.

9. The wireless communication system of claim 1, wherein the data duplication is located at a packet data convergence protocol (PDCP) layer, the transmitting UE duplicates a packet and performs packet routing, and the one or more receiving UEs perform duplication detection or are configured to perform duplication detection and discarding packets.

10. The wireless communication system of claim 1, wherein the on/off-switching of the data duplication is handled by a medium access control (MAC) layer, and/or the on/off-switching of the data duplication is handled by a physical (PHY) layer.

11. The wireless communication system of claim 1, wherein the transmitting UE and/or the receiving UE is configured to apply an algorithm for determining, using parameters of the wireless communication network and received or measured link quality indicators, whether data duplication it to be activated or deactivated.

12. The wireless communication system of claim 1, wherein the wireless communication system is configured to deactivate or not activate the data duplication in case one or more of the following criteria are not met:

a priority is higher than a certain priority threshold, an entailed latency is higher than a certain latency threshold, a data rate is higher than a certain data rate threshold, the sidelink quality is better than a certain link quality threshold, a service class is below a certain service class threshold.

13. The wireless communication system of claim 1, wherein the wireless communication system is configured to not use the data duplication when the sidelink is established, but to turn on the data duplication responsive to meeting a certain condition.

14. The wireless communication system of claim 1, wherein the wireless communication system comprises a hardcoded/defined/pre-configured set of standardized sidelink services.

15. The wireless communication system of claim 1, wherein, responsive to activating the data duplication, the transmitting UE is configured to transmit a plurality of different versions of one or more data packets over the sidelink to the receiving UE, wherein transmitting different versions of the data packet comprises one or more of:

(i) transmitting the data packet itself, or (ii) transmitting one or more duplicates of the data packet, or (iii) transmitting one or more redundancy versions of the data packet, or (iv) transmitting one or more erasure correction codes for the data packet, or (v) a combination of any of (i) to (iv).

16. A base station for a wireless communication system, the wireless communication system comprising a plurality of user devices, UEs, configured for a sidelink communication on a sidelink using resources from a set of sidelink resources of the wireless communication system, wherein the plurality of UEs comprises a transmitting UE and a receiving UE, the transmitting UE and the receiving UE configured to use at least a subset of the set of sidelink resources of the wireless communication system for the sidelink communication, wherein the base station is configured to allow a data duplication on the sidelink, wherein the data duplication on the sidelink is activated or triggered dependent on one or more of a sidelink quality of the sidelink between the transmitting UE and the receiving UE, and/or an occupancy of the sidelink resources, and/or data received by a network element/network function, and/or an application service running on one of the UEs, wherein the transmitting and receiving UEs are in-coverage or are out-of-coverage, wherein in case the transmitting and receiving UEs are in-coverage, the base station is configured to provide a set of configurations with different parameters, the set of configurations comprising a first configuration causing the data duplication to be switched-on and a second configuration causing the data duplication to be switched-off, the base station is configured to receive from the UEs feedback information, the feedback information being sent by the transmitting UE directly to the base station or by the receiving UE to the base station directly, via the transmitting UE or via a further UE, and responsive to the feedback information, the base station is configured to signal switching-on or switching-off the data duplication, and wherein in case the transmitting and receiving UEs are out-of-coverage, the UEs are pre-configured with the set of configurations with the different parameters, the set of configurations comprising the first configuration causing the data duplication to be switched-on and the second configuration causing the data duplication to be switched-off, the UEs are configured to provide the feedback information via the sidelink, and responsive to the feedback information, switching-on or switching-off the data duplication is signaled.

17. A user device, UE, for a wireless communication system, the wireless communication system comprising a plurality of user devices, UEs, configured for a sidelink communication on a sidelink using resources from a set of sidelink resources of the wireless communication system, the plurality of UEs including the UE, wherein the UE is a transmitting UE and is configured to use at least a subset of the set of sidelink resources of the wireless communication system for the sidelink communication with a receiving UE, wherein the UE is configured to allow a data duplication on the sidelink, wherein the data duplication on the sidelink is activated or triggered dependent on one or more of a sidelink quality of the sidelink between the transmitting UE and the receiving UE, and/or an occupancy of the sidelink resources, and/or data received by a network element/network function, and/or an application service running on one of the UEs, wherein the transmitting and receiving UEs are in-coverage or are out-of-coverage, wherein in case the transmitting and receiving UEs are in-coverage, the UE is to receive from a base station of the wireless communication system a set of configurations with different parameters, the set of configurations comprising a first configuration causing the data duplication to be switched-on and a second configuration causing the data duplication to be switched-off, the UEs are configured to provide feedback information to the base station, the feedback information being sent by the transmitting UE directly to the base station or by the receiving UE to the base station directly, via the transmitting UE or via a further UE, and responsive to the feedback information, switching-on or switching-off the data duplication is signaled, and wherein in case the transmitting and receiving UEs are out-of-coverage, the UEs are pre-configured with the set of configurations with the different parameters, the set of configurations comprising the first configuration causing the data duplication to be switched-on and the second configuration causing the data duplication to be switched-off, the UE is configured to provide the feedback information via the sidelink, and responsive to the feedback information, switching-on or switching-off the data duplication is signaled.

18. A method for operating a wireless communication system, the wireless communication system comprising a plurality of user devices, UEs, configured for a sidelink communication on a sidelink using resources from a set of sidelink resources of the wireless communication system, wherein the plurality of UEs comprises a transmitting UE and a receiving UE, the method comprising:

performing the sidelink communication between the transmitting UE and the receiving UE using at least a subset of the set of sidelink resources of the wireless communication system, allowing a data duplication on the sidelink, wherein the data duplication on the sidelink is activated or triggered dependent on one or more of a sidelink quality of the sidelink between the transmitting UE and the receiving UE, and/or an occupancy of the sidelink resources, and/or data received by a network element/network function, and/or an application service running on one of the UEs, wherein the transmitting and receiving UEs are in-coverage or are out-of-coverage, wherein in case the transmitting and receiving UEs are in-coverage, providing, by a base station of the wireless communication system, a set of configurations with different parameters, the set of configurations comprising a first configuration causing the data duplication to be switched-on and a second configuration causing the data duplication to be switched-off, providing, by the UEs, feedback information to the base station, the feedback information being sent by the transmitting UE directly to the base station or by the receiving UE to the base station directly, via the transmitting UE or via a further UE, and responsive to the feedback information, signaling switching-on or switching-off the data duplication, and wherein in case the transmitting and receiving UEs are out-of-coverage, the UEs are pre-configured with the set of configurations with the different parameters, the set of configurations comprising the first configuration causing the data duplication to be switched-on and the second configuration causing the data duplication to be switched-off, providing, by the UEs, the feedback information via the sidelink, and responsive to the feedback information, signaling switching-on or switching-off the data duplication.

19. A non-transitory digital storage medium having stored thereon a computer program for performing, when said computer program is run by a computer, a method for operating a wireless communication system, the wireless communication system comprising a plurality of user devices, UEs, configured for a sidelink communication on a sidelink using resources from a set of sidelink resources of the wireless communication system, wherein the plurality of UEs comprises a transmitting UE and a receiving UE, the method comprising:

performing the sidelink communication between the transmitting UE and the receiving UE using at least a subset of the set of sidelink resources of the wireless communication system, allowing a data duplication on the sidelink, wherein the data duplication on the sidelink is activated or triggered dependent on one or more of
- a sidelink quality of the sidelink between the transmitting UE and the receiving UE, and/or
- an occupancy of the sidelink resources, and/or
- data received by a network element/network function, and/or
- an application service running on one of the UEs, wherein the transmitting and receiving UEs are in-coverage or are out-of-coverage, wherein in case the transmitting and receiving UEs are in-coverage,
- providing, by a base station of the wireless communication system, a set of configurations with different parameters, the set of configurations comprising a first configuration causing the data duplication to be switched-on and a second configuration causing the data duplication to be switched-off,
- providing, by the UEs, feedback information to the base station, the feedback information being sent by the transmitting UE directly to the base station or by the receiving UE to the base station directly, via the transmitting UE or via a further UE, and
- responsive to the feedback information, signaling switching-on or switching-off the data duplication, and wherein in case the transmitting and receiving UEs are out-of-coverage,
- the UEs are pre-configured with the set of configurations with the different parameters, the set of configurations comprising the first configuration causing the data duplication to be switched-on and the second configuration causing the data duplication to be switched-off,
- providing, by the UEs, the feedback information via the sidelink, and
- responsive to the feedback information, signaling switching-on or switching-off the data duplication.

* * * * *